United States Patent
Pekelny et al.

(10) Patent No.: US 10,762,219 B2
(45) Date of Patent: Sep. 1, 2020

(54) AUTOMATIC PERMISSIONS FOR VIRTUAL OBJECTS

(71) Applicant: MICROSOFT TECHNOLOGY LICENSING, LLC, Redmond, WA (US)

(72) Inventors: Yuri Pekelny, Seattle, WA (US); Michael Bleyer, Seattle, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 13 days.

(21) Appl. No.: 15/983,408

(22) Filed: May 18, 2018

(65) Prior Publication Data

US 2019/0354698 A1 Nov. 21, 2019

(51) Int. Cl.
  *G06F 21/00* (2013.01)
  *G06F 21/60* (2013.01)
  *G06T 17/20* (2006.01)

(52) U.S. Cl.
  CPC .......... *G06F 21/604* (2013.01); *G06T 17/20* (2013.01)

(58) Field of Classification Search
  None
  See application file for complete search history.

(56) References Cited

U.S. PATENT DOCUMENTS

| | | | | |
|---|---|---|---|---|
| 8,046,719 | B2 * | 10/2011 | Skourup | G06F 3/011 715/757 |
| 8,105,680 | B2 * | 1/2012 | Bender | B32B 27/08 428/200 |
| 9,122,321 | B2 * | 9/2015 | Perez | G06F 3/033 |
| 9,679,144 | B2 | 6/2017 | Molnar et al. | |
| 9,928,661 | B1 * | 3/2018 | Kinstner | A63F 13/00 |
| 2006/0238380 | A1 | 10/2006 | Kimchi et al. | |
| 2011/0249190 | A1 * | 10/2011 | Nguyen | H04N 5/272 348/708 |
| 2012/0105473 | A1 * | 5/2012 | Bar-Zeev | G02B 27/017 345/633 |
| 2013/0038601 | A1 | 2/2013 | Han et al. | |
| 2013/0046853 | A1 * | 2/2013 | Shuster | G06T 19/20 709/217 |

(Continued)

OTHER PUBLICATIONS

"International Search Report and Written Opinion Issued in PCT Application No. PCT/US19/031639", dated Jul. 16, 2019, 13 Pages.

(Continued)

*Primary Examiner* — Maung T Lwin
(74) *Attorney, Agent, or Firm* — Workman Nydegger

(57) ABSTRACT

Optimizations are provided to control access to virtual content included within a three-dimensional (3D) mesh. Specifically, after the 3D mesh is accessed, then objects represented by the 3D mesh are segmented so that they are distinguishable from one another. Once segmented, then a permissions is assigned to each object or even to groups of objects. For instance, all of the objects that are associated with a particular sub-space (e.g., a bedroom or a living room) may be assigned the same permissions. By assigning permissions to objects, it is possible to control which requesting entities will have access to the objects as well as how much access each of those requesting entities is afforded.

17 Claims, 23 Drawing Sheets

(56) References Cited

U.S. PATENT DOCUMENTS

| | | | |
|---|---|---|---|
| 2013/0275886 A1* | 10/2013 | Haswell | G06Q 30/0241 |
| | | | 715/757 |
| 2014/0059453 A1 | 2/2014 | Shuster et al. | |
| 2014/0099017 A1* | 4/2014 | Tsai | G06T 17/00 |
| | | | 382/154 |
| 2014/0282911 A1 | 9/2014 | Bare et al. | |
| 2014/0306994 A1 | 10/2014 | Brown et al. | |
| 2015/0138063 A1* | 5/2015 | Cao | G06F 3/0304 |
| | | | 345/156 |
| 2015/0143459 A1* | 5/2015 | Molnar | G06F 21/629 |
| | | | 726/2 |
| 2015/0145887 A1* | 5/2015 | Forutanpour | G06F 3/017 |
| | | | 345/633 |
| 2016/0042568 A1 | 2/2016 | Farnham et al. | |
| 2016/0140761 A1 | 5/2016 | Saunders et al. | |
| 2016/0189426 A1* | 6/2016 | Thomas | G06T 19/006 |
| | | | 345/633 |
| 2016/0300387 A1* | 10/2016 | Ziman | G06F 3/165 |
| 2016/0337599 A1 | 11/2016 | Williams et al. | |
| 2017/0115488 A1* | 4/2017 | Ambrus | G02B 27/0172 |
| 2017/0220887 A1 | 8/2017 | Fathi et al. | |
| 2017/0336941 A1* | 11/2017 | Gribetz | G06F 3/04815 |
| 2017/0337726 A1 | 11/2017 | Bui et al. | |
| 2018/0276467 A1 | 9/2018 | Kaehler | |

OTHER PUBLICATIONS

Chang, et al., "Matterport3D: Learning from RGB-D Data in Indoor Environments", In Journal of Computing Research Repository, Sep. 2017, 25 Pages.

Elhamshary, et al., "SemSense: Automatic Construction of Semantic Indoor Floorplans", In Proceedings of International Conference on Indoor Positioning and Indoor Navigation, Oct. 13, 2015, 11 Pages.

Konings, Bastian Albert Josef, "User-centered awareness and control of privacy in ubiquitous computing", In Dissertation of University of Ulm, Jul. 14, 2015, 409 Pages.

Shao, et al., "An Interactive Approach to Semantic Modeling of Indoor Scenes with an RGBD Camera", In Journal of ACM Transactions on Graphics, vol. 31, Issue 6, Nov. 2012, 11 Pages.

Turner, et al., "Multistory Floor Plan Generation and Room Labeling of Building Interiors from Laser Range Data", In Proceedings of International Joint Conference on Computer Vision, Imaging and Computer Graphics, Jan. 5, 2014, pp. 1-16.

Vilk, et al., "Least Privilege Rendering in a 3D Web Browser", In Microsoft Research Technical Report MSR-TR-2014-25, Feb. 1, 2014, pp. 1-12.

"Non Final Office Action Issued in U.S. Appl. No. 16/040,675", dated Jan. 3, 2020, 20 Pages.

"Notice of Allowance Issued in U.S. Appl. No. 16/040,675", dated Apr. 6, 2020, 14 Pages.

* cited by examiner

AUTOMATIC PERMISSIONS FOR VIRTUAL OBJECTS

BACKGROUND

Mixed-reality systems, including virtual-reality (VR) and augmented-reality (AR) systems, have received significant attention because of their ability to create truly unique experiences for their users. For reference, conventional VR systems create a completely immersive experience by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting holograms that are placed in or that interact with the real world.

As used herein, VR and AR systems are described and referenced interchangeably. Unless stated otherwise, the descriptions herein apply equally to all types of mixed-reality systems, which (as detailed above) include AR systems, VR systems, and/or any other similar system capable of displaying holograms.

Some of the disclosed mixed-reality systems use one or more on-body devices (e.g., the HMD, a handheld device, etc.). The HMD provides a display that enables a user to view overlapping and/or integrated visual information (e.g., holograms) in whatever environment the user is in, be it a VR environment, an AR environment, or any other type of environment. Continued advances in hardware capabilities and rendering technologies have greatly improved how mixed-reality systems render holograms. Notwithstanding those advances, the process of immersing a user into a mixed-reality environment creates many challenges, difficulties, and costs, particularly with regard to safeguarding and/or securing holographic information.

For instance, methodologies are in place to scan an environment in order to reconstruct any geometric surfaces included within that environment. This scanning process includes obtaining multiple images of the environment and then generating/building depth maps and/or point clouds using those images. The information in these depth maps is then stitched together to generate a coherent three-dimensional (3D) mesh representing the environment as a whole, including the geometric surfaces.

Although techniques are available for generating these 3D meshes, there is a substantial need to improve how the information in those 3D meshes is secured. Consider, as an example, a scenario where a user scans her bedroom and a 3D mesh of that bedroom is created. Bedrooms are typically considered to be private areas. Therefore, it is highly unlikely that the user will want to share her bedroom's 3D mesh with any random user. As more environments (e.g., living rooms, dining rooms, office spaces, sidewalks, or even parks) are mapped in virtual space (e.g., the 3D mesh), there is an ever increasing need to regulate the accessibility of this virtual space information.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

The disclosed embodiments are directed to systems and methods that control access to holographic information (e.g., 3D meshes, virtual objects and/or other virtual environment regions) by discriminately granting access to the holographic information in accordance with an assigned or applied permissions. For example, in some embodiments, a 3D mesh of an environment is provided. The 3D mesh represents an aggregation of information about objects, including virtual representations of real-world objects and/or virtual objects that are projectable into the environment. By segmenting the 3D mesh, an object type can be determined for each of those representations/objects. Once the types are determined, then permissions can be assigned to each object or group of objects in order to control how any individual object or group of objects is accessed.

In some embodiments, the environment corresponds to a virtual environment region (e.g., a floor of a building, where the floor includes multiple rooms/regions (i.e. sub-spaces) and where each room includes different objects). In these scenarios, the 3D mesh may be programmatically or logically divided into different partitions, with one partition being formed for each environment sub-space (e.g., room). Once this is done, permissions are assigned to the different virtual environment regions and sub-spaces, as well as the individual virtual objects/holograms. Additionally, access to the holographic information is then controlled, regardless of whether the access is for an individual object or for an entire region (e.g., a group of virtual objects).

In some embodiments, the 3D mesh may be associated with a permissions "hierarchy" that tracks and records the various different permissions for each object and/or group of objects. To access any particular object or group of objects represented by the 3D mesh, a query is first submitted to determine whether the requesting entity has adequate permissions for those objects. If so, then those objects will become accessible to the requesting entity. If not, then those objects will not become accessible.

In some embodiments, the permissions can also control when and to what extent users are able to update or modify the 3D mesh. For example, in many instances, new objects will arise since the last time the 3D mesh was updated (e.g., a car is now parked in a driveway or a new hologram is created at a particular location). Therefore, some embodiments determine a computer system's geographic location. Based on this information, a 3D mesh corresponding to that geographic area is then accessed. New objects are then identified even though they were not previously included in the 3D mesh. Finally, a determination is made as to whether the 3D mesh should actually be updated to include information about these new objects.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Systems and methods for limiting access to holographic information (e.g., virtual objects and virtual environment regions) are provided. In some instances, permissions are assigned or applied to holographic objects. These holographic objects are described/represented by a 3D mesh. By associating a permissions with each object or group of objects, the embodiments are able to selectively control how those objects are viewed, shared, interacted with, or modified.

In some embodiments, the 3D mesh is associated with or linked to a permissions hierarchy that tracks and records the permissions for the holographic objects and groups of objects. When access to a particular holographic object or even to a group of objects is desired, a query is first generated to determine whether the requesting entity has adequate permissions. If so, then the requested holographic objects will become accessible to the requesting entity, otherwise, they will not.

In some embodiments, the 3D mesh can also be updated if adequate permissions are available. For instance, some embodiments initially determine a computer system's geographic location. The 3D mesh corresponding to that geographic location/area is then accessed. If new objects are present, then they are identified, even if they were not previously included in the 3D mesh. The embodiments then determine whether to update the 3D mesh by including information about these new objects.

Figure 1A:
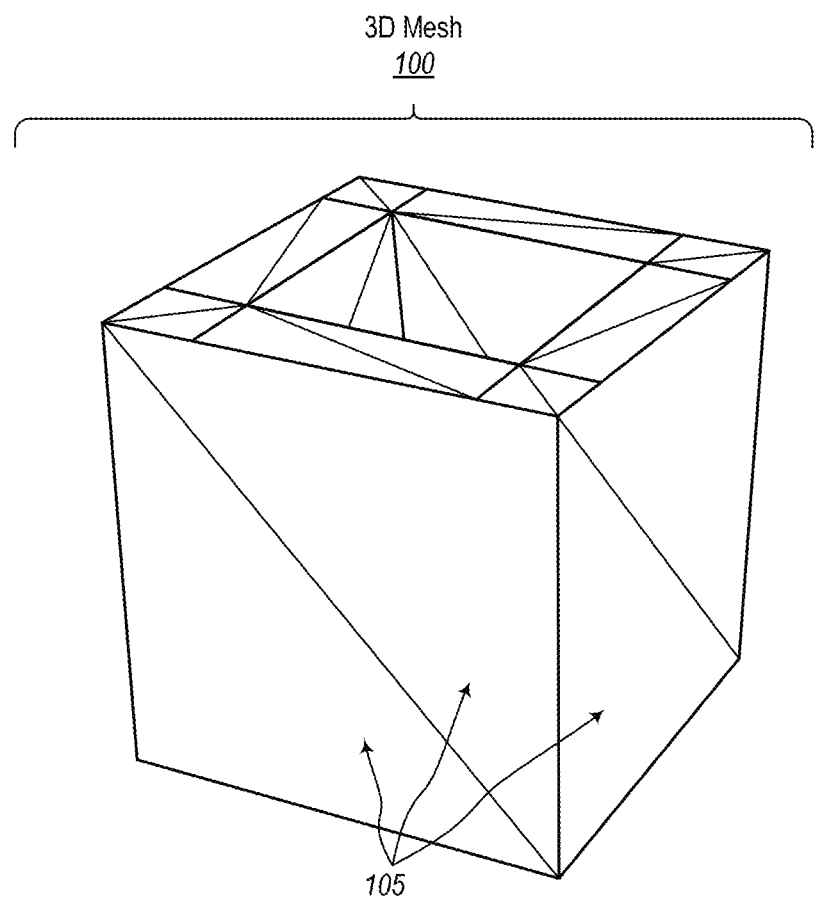
FIG. 1A illustrates a 3D mesh and, in particular, how a triangular 3D mesh can be used to describe the geometric surfaces of an object.

As used herein, a "3D mesh" (e.g., 3D mesh 100 shown in FIG. 1A), digitally describes the contours, edges, vertices, and/or faces of any kind of geometric surface. A 3D mesh is formed by aggregating or fusing together multiple different depth maps, where each depth map captures a different depth perspective of the geometric surface. This fusion process eventually generates a coherent representation of the geometric surface. Although not required, the 3D mesh is often a triangular 3D mesh comprised of many different triangles (e.g., triangles 105 in FIG. 1A). The collective combination of these triangles accurately represents the various features of the geometric surface. A 3D mesh may be generated for only a single object or for an entire environment or region. When the 3D mesh is of an entire region, then it can be thought of as a compilation of holograms or holographic information that describes "objects" and the different geometric surfaces of those objects (e.g., the walls, doors, tables, windows, etc.).

Figure 1B:
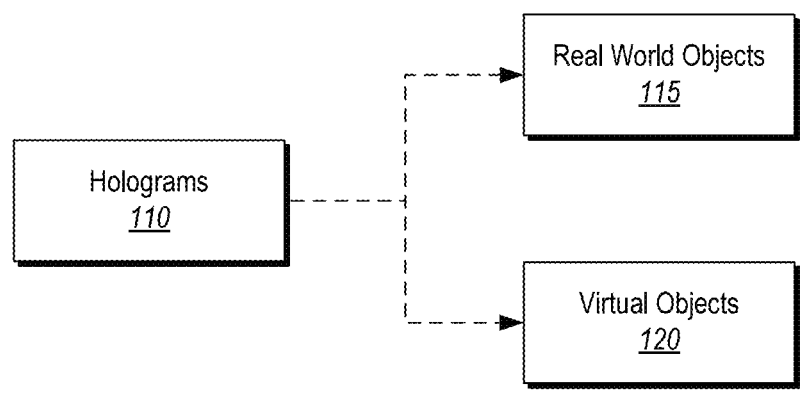
FIG. 1B shows how a hologram can portray a virtual representation of a real-world item or a virtual item (e.g., a fire-breathing dragon crashing through a wall).

As used herein, the term "object" broadly refers to (1) real-world items, (2) virtual representations of real-world items, or even (3) virtual information that has no relation to any real-world items. The term "hologram" broadly refers to any virtual construct recognizable as having meaning. For instance, by way of example, a hologram can include such things as a virtual wall, a virtual dragon, a virtual table, a virtual flying machine, a virtual representation of a real-world wall, or a virtual representation of a real-world car, or any other virtual representation of an object. For example, hologram 110, shown in FIG. 1B, is a digital construct describing either a virtual representation of a real-world item (e.g., real world objects 115) or a virtual object (e.g., virtual objects 120). In AR environments, holograms are projected next to real-world items. In VR environments, the entire environment is formed from holograms, some of which may be virtual representations of real-world items and some of which may be virtual objects.

By practicing the disclosed embodiments, significant advantages are realized because access to virtual content included within a 3D mesh is regulated. Such operations are particularly beneficial because they help safeguard data that may be considered private or confidential. As an example, consider a scenario where an office environment includes some confidential work holograms. It may be desirable to limit who can access these confidential work holograms so that only authorized employees or computers are provided permissions while restricting other users (e.g., guests to the office) or computers from having permissions.

As another example, consider a classroom environment. At one point during the day, the classroom may be used to teach one subject (e.g., biology) while at a different point during the day, the classroom may be used to teach a different subject (e.g., physics). To assist with the teaching process, the biology professor may provide one or more biology-themed holograms, and the physics professor may provide one or more physics-themed holograms. By following the disclosed principles, the biology students will be able to access the biology-themed holograms, and the physics students will be able to access the physics-themed holograms, based on permissions assigned to the holograms and corresponding authorizations of the students. Accordingly, the disclosed embodiments provide many advantages by securing and safeguarding the content included within a 3D mesh.

Having just described some of the features and benefits of the disclosed embodiments at a high level, attention will now be directed to FIGS. 2 through 5 which show some example scenarios in which holograms may be used. Subsequently, FIGS. 6 through 13, which discuss features of a 3D mesh and a permissions hierarchy for that 3D mesh, will be provided. FIGS. 14A through 19 illustrate various scenarios and methodologies related to controlling access to content included in the 3D mesh. Lastly, the disclosure will turn to FIG. 20 which shows an example computer system that can perform the disclosed operations.

Holograms And 3D Meshes

Figure 2:
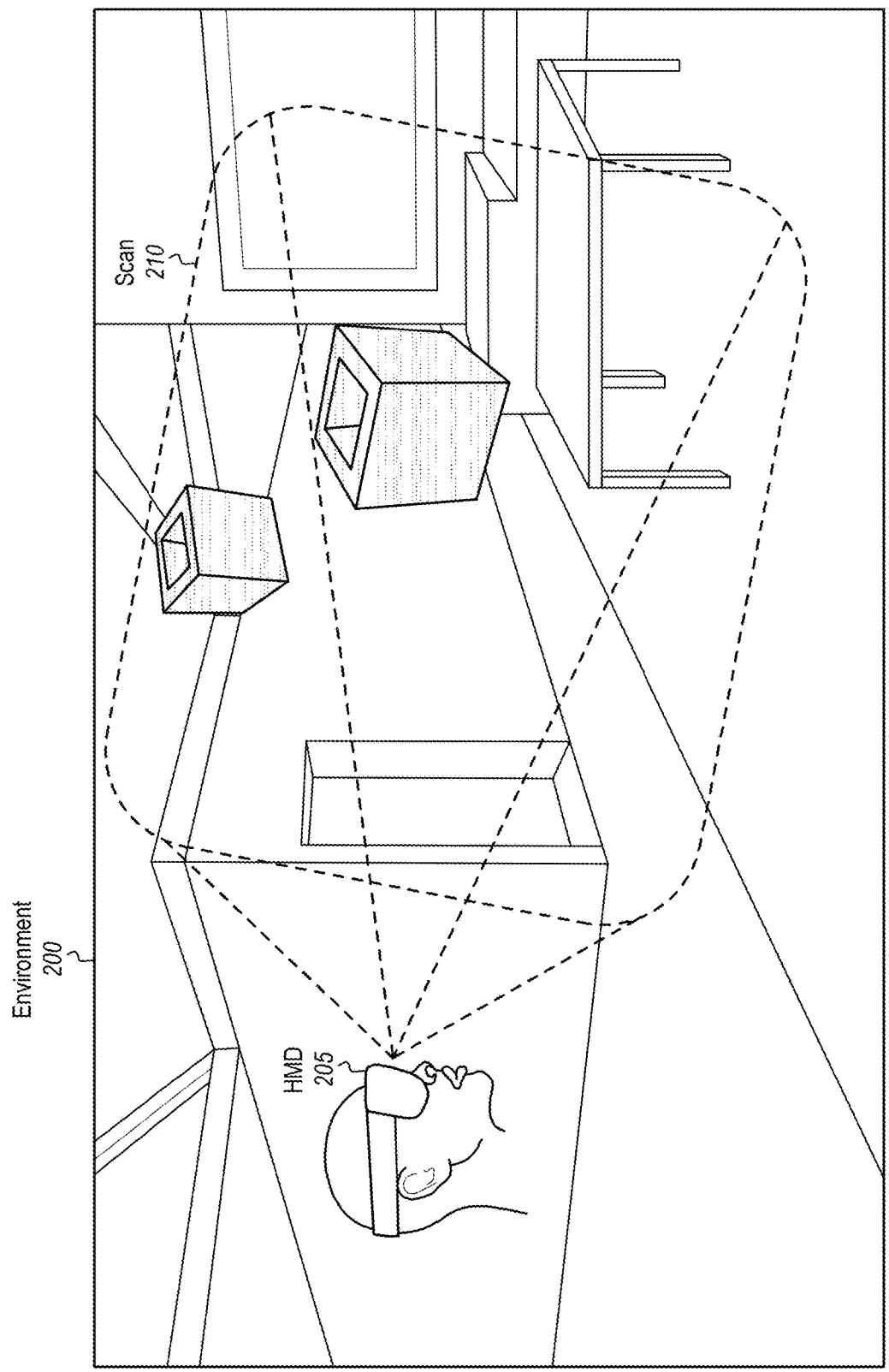
FIG. 2 shows how holograms may be displayed in a mixed-reality environment.

FIG. 2 shows an environment 200 in which a user is using a HMD 205 to engage with the environment 200. Initially, HMD 205 is being used to scan 210 environment 200 to generate a 3D mesh of environment 200. This is performed so that holograms can be created and projected into environment 200.

Figure 3:
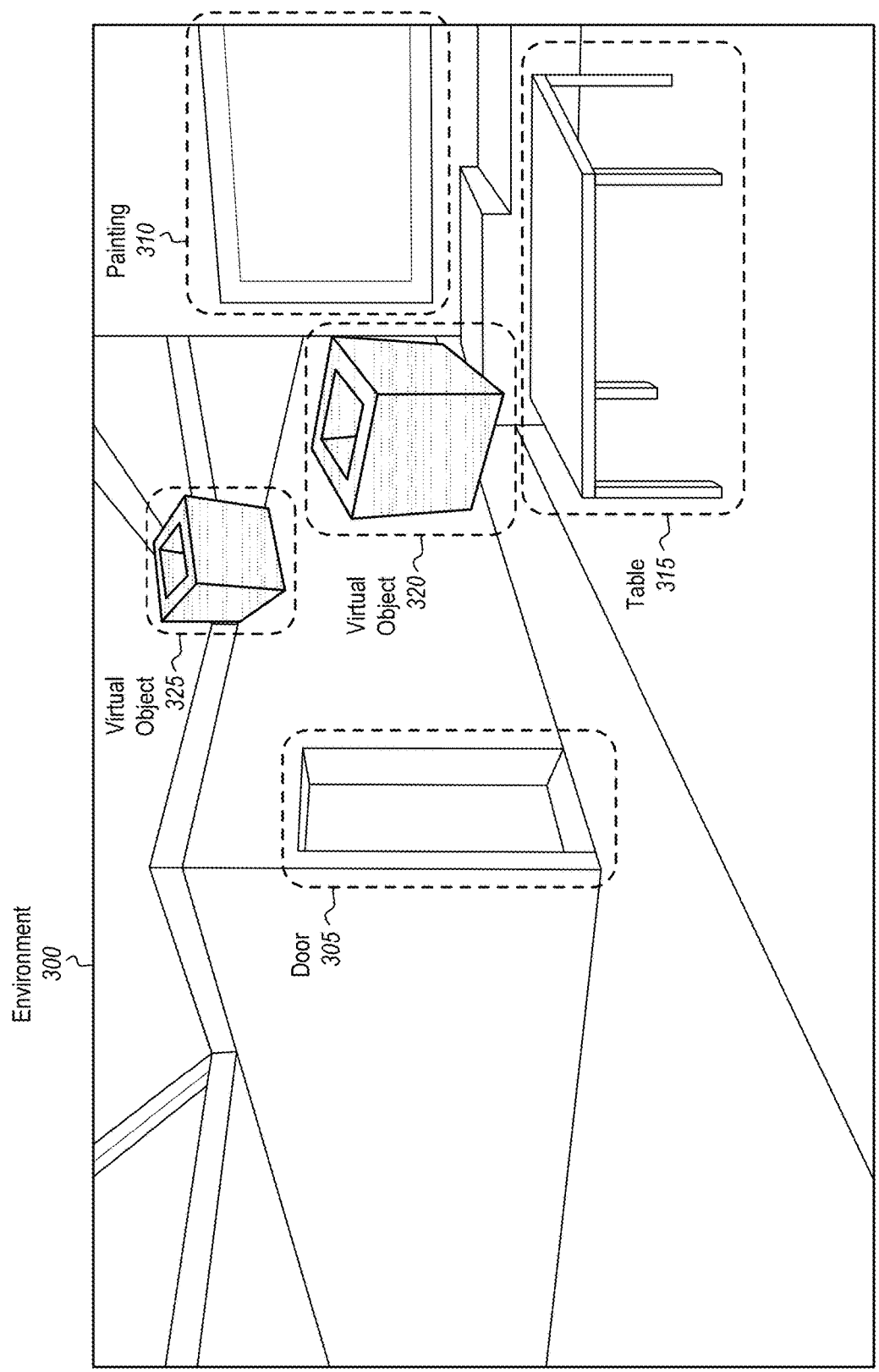
FIG. 3 illustrates how objects can be segmented from one another and how those objects' types can be identified.

After generating the 3D mesh, objects associated with that environment can be identified. For example, FIG. 3 shows an environment 300 (e.g., a hallway environment) that is an example representation of environment 200 from FIG. 2. Objects included within the resulting 3D mesh are segmented. For instance, FIG. 3 shows a door object 305, a painting object 310, a table object 315, a first virtual object 320, and a second virtual object 325. The door object 305, painting object 310, and table object 315 correspond to real-world items and corresponding virtual representations of these objects can be generated and included in a 3D mesh of the environment. The first and second virtual objects 320 and 325 (i.e. holograms) correspond to virtual objects and are also included in the 3D mesh of the environment. As shown, the disclosed embodiments are able to identify a type for each of the objects. This may be achieved via machine learning or via any other segmentation technique.

Figure 4:
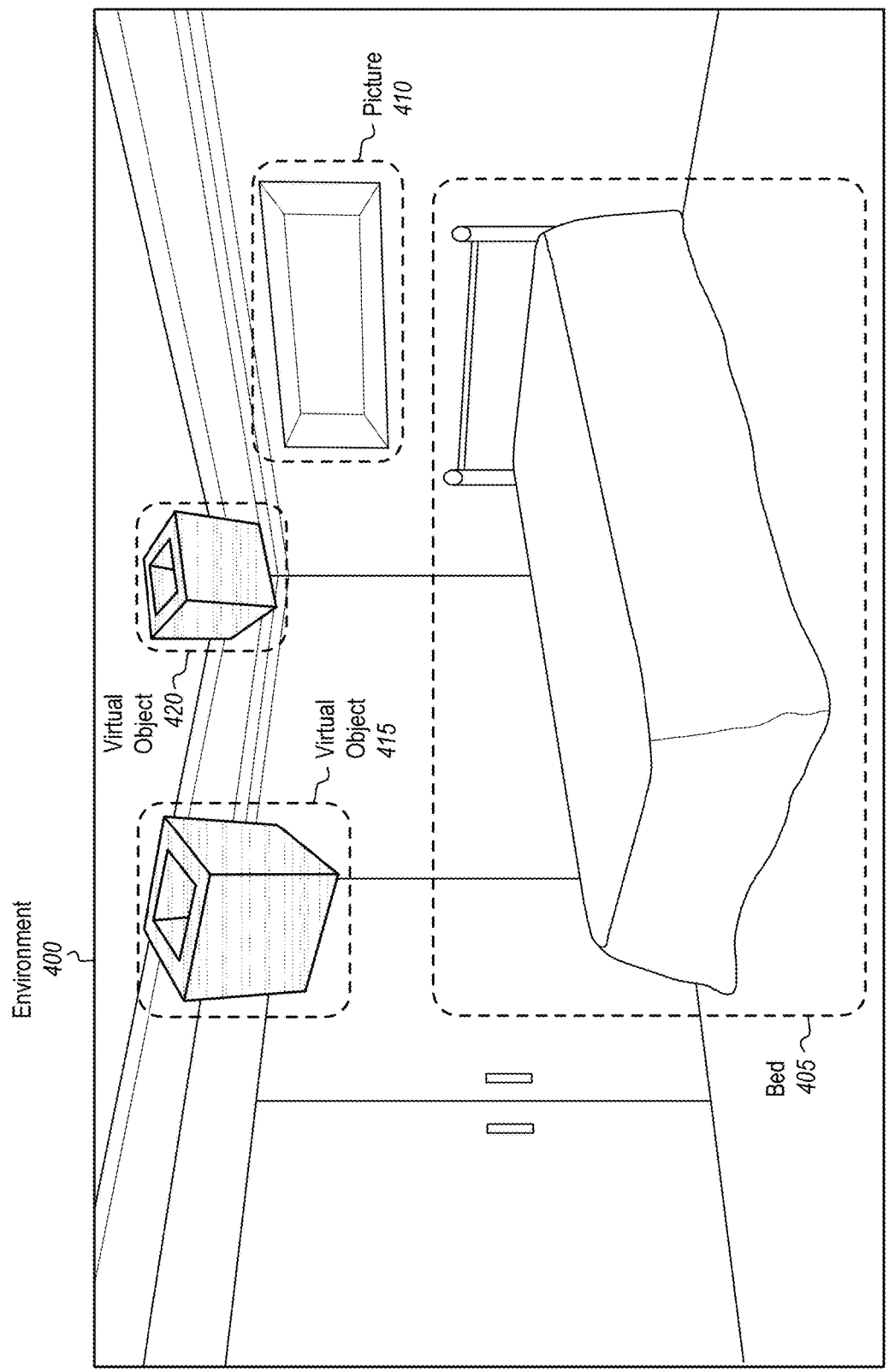
FIG. 4 shows a private bedroom area that includes different types of objects (e.g., real-world items and holograms).

Whereas FIG. 3 showed an open hallway, FIG. 4 shows an example of a more private area (i.e. a bedroom) in the form of environment 400. Here, there is a bed 405 and a picture 410 (comprising physical objects and/or virtual objects), a first virtual object 415, and a second virtual object 420.

Figure 5:
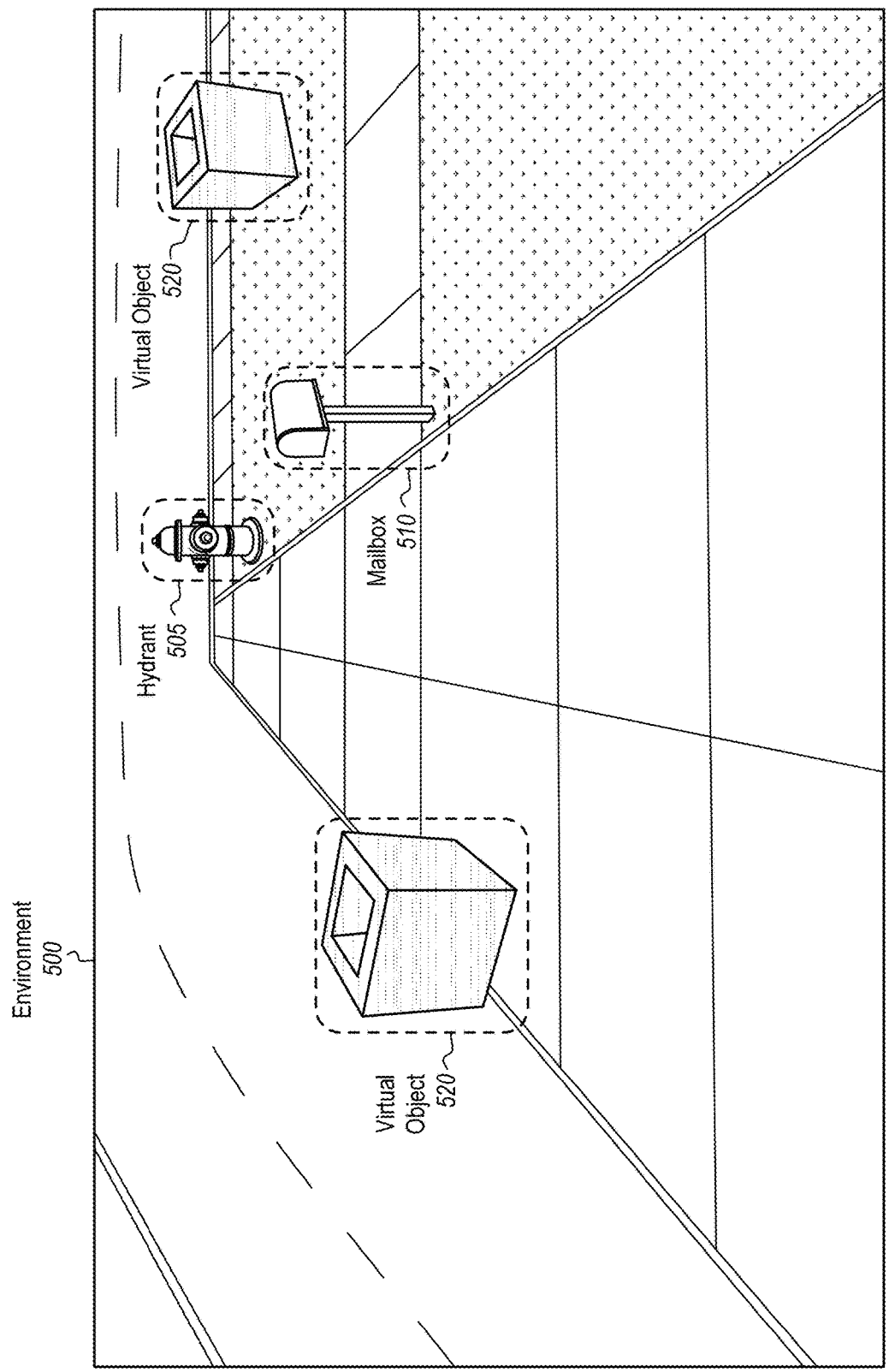
FIG. 5 shows a public sidewalk area that includes different types of objects.

FIG. 5 shows yet another environment 500. Here, environment 500 is a public area (i.e. a sidewalk) that includes a hydrant 505, a mailbox 510, a first virtual object 515, and a second virtual object 520. Accordingly, FIGS. 2 through 5 demonstrate that holograms may be projected into any kind of environment, be it a public area, a private area, or a shared area. Furthermore, these figures demonstrate that holograms may be projected next to real-world objects (in the case of an AR environment), or an entire environment may be formed from holograms (in the case of a VR environment).

3D Meshes

Figure 6:
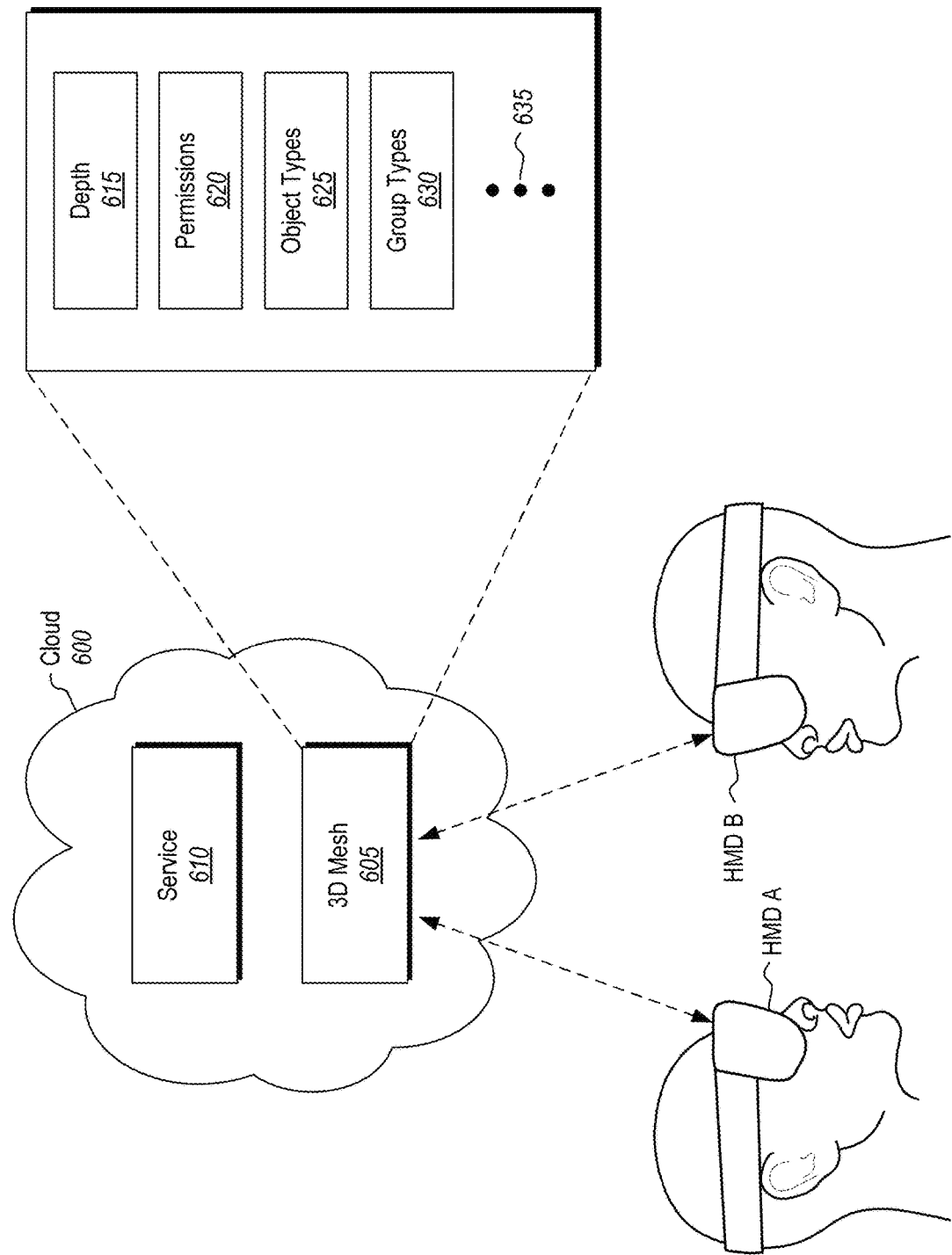
FIG. 6 shows how a 3D mesh can be stored in a cloud environment as well as some of the information that may be included in the 3D mesh.

FIG. 6 shows a cloud environment 600 that includes a 3D mesh 605 and a service 610. The 3D mesh 605 may be representative of the 3D meshes discussed earlier. Because 3D mesh 605 is stored in the cloud 600, different users may be able to access it from anywhere around the world. For example, a first user who is wearing HMD A and a second user who is wearing HMD B may both be able to access the 3D mesh 605. If these two users are engaging with the same portion of 3D mesh 605 at the same time, then the two users may also be able to view and interact with each other via this connection. While the 3D mesh 605 is shown as a single mesh, it will be appreciated that the 3D mesh 605 may actually comprise a plurality of discrete and separate 3D meshes that are connectable and/or selectably connected.

As shown, 3D mesh 605 includes or is associated with depth information 615, permissions information 620, object type information 625, and group type information 630. The ellipsis 635 demonstrates that the 3D mesh 605 may include or be associated with other types of information and is not limited simply to that which is shown in FIG. 6. Further detail on these features will be provided later.

In some embodiments, the 3D mesh 605 is uploaded into the cloud 600 and then the service 610 analyzes the 3D mesh 605 to identify and extract the different objects and group types, which will be explained in more detail later. For example, the service 610 may apply machine learning on 3D mesh 605 to segment objects and categorize groups of objects. As such, the process of segmenting objects may be performed in the cloud 600. In other embodiments, a HMD (e.g., HMD A) may perform the segmentation process.

Segmenting an object initially includes identifying which pixels correspond to that object and then forming a relationship between those pixels. As a whole, the group of corresponding pixels digitally represents a object. The process of segmenting also includes intelligently identifying what object(s) a group of pixels represents. For example, consider a picture of a bicycle with a fence in the background. During the segmentation process, the pixels corresponding to the bicycle will be separated from the pixels corresponding to the fence. Additionally, the segmentation process will identify that the pixels for the bicycle correspond to a "bicycle" while the pixels for the fence correspond to a "fence." Although this process may be intuitive for a human, computers typically have to be trained (via machine learning) to segment objects. In this manner, the segmentation process includes grouping pixels and then categorizing those pixels so that they correspond to a discernable object.

Figure 7:
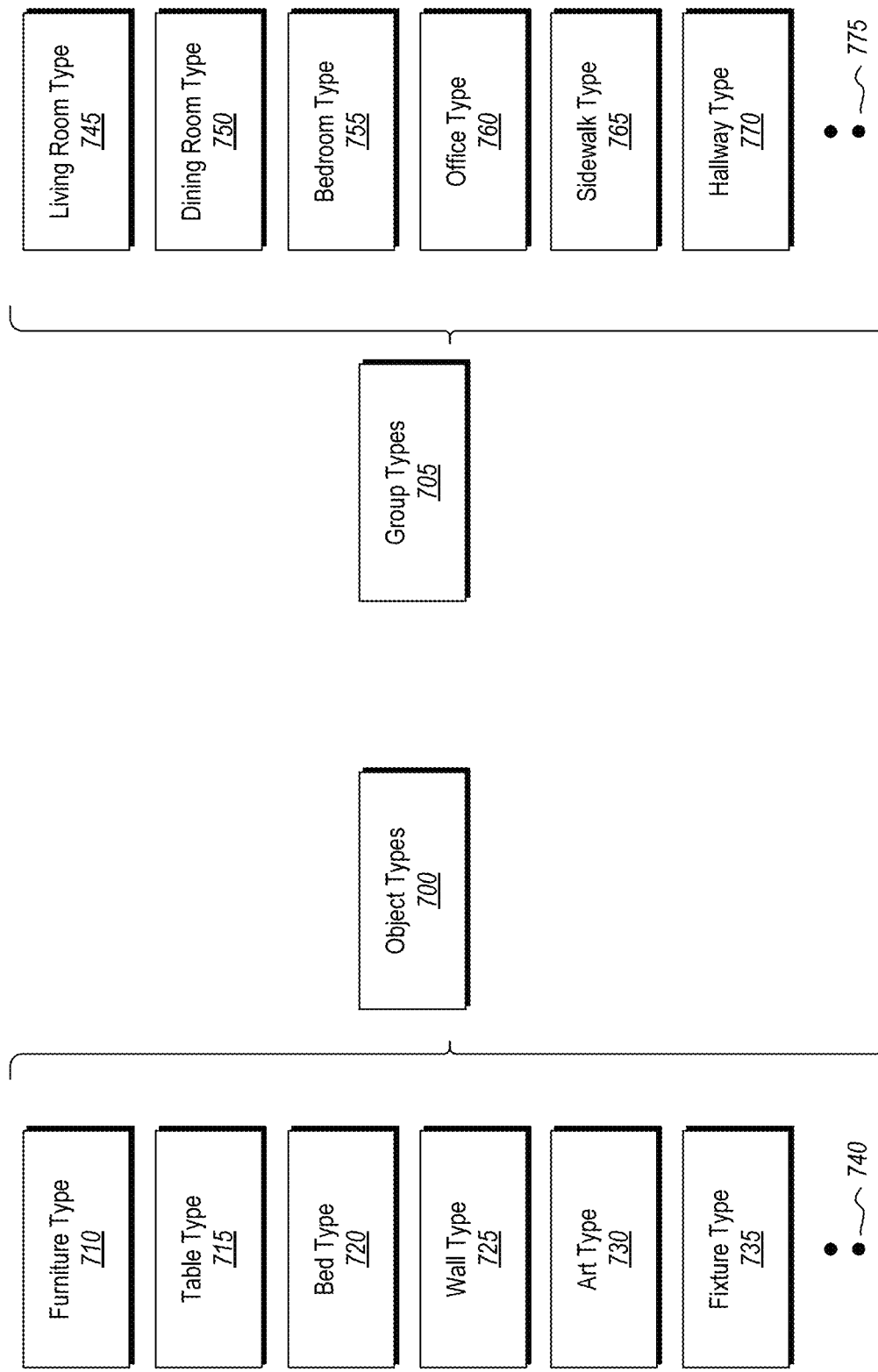
FIG. 7 illustrates some of the different segmentation classifications/types that an object may be given as well as some of the group types that are available.

FIG. 7 shows some example object types 700 and group types 705 that may be used during the segmentation process. Object types 700 correspond to a collection of pixels representing a single object (e.g., a bicycle) while group types 705 correspond to a collection of multiple different objects (e.g., a bedroom that includes a bed, a wall, and a dresser). As shown, object types 700 include, but are not limited to, a furniture type 710, a table type 715, a bed type 720, a wall type 725, an art type 730, and a fixture type 735. The ellipsis 740 demonstrates that other types are available as well. In fact, there are an innumerable number of object types because of the almost infinite number of different real-world objects in combination with the limitless potential of humans to create new holographic information.

Group types 705 include, but are not limited to, a living room type 745, a dining room type 750, a bedroom type 755, an office type 760, a sidewalk type 765, and a hallway type 770, or any other area type. For instance, the ellipsis 775 demonstrates that other group types may be used as well, including geography type, region type, city type, campus type, floor type, building type, or any other bounded area type. Accordingly, the disclosed embodiments are able to segment objects/holograms included within a 3D mesh and group objects together based on certain characteristics of those objects (e.g., a set of objects are all associated with a particular room). Such a process is beneficial because it enables the embodiments to assign permissions to any one of those objects as well as to an entire group of objects, as will be described later.

Figure 8:
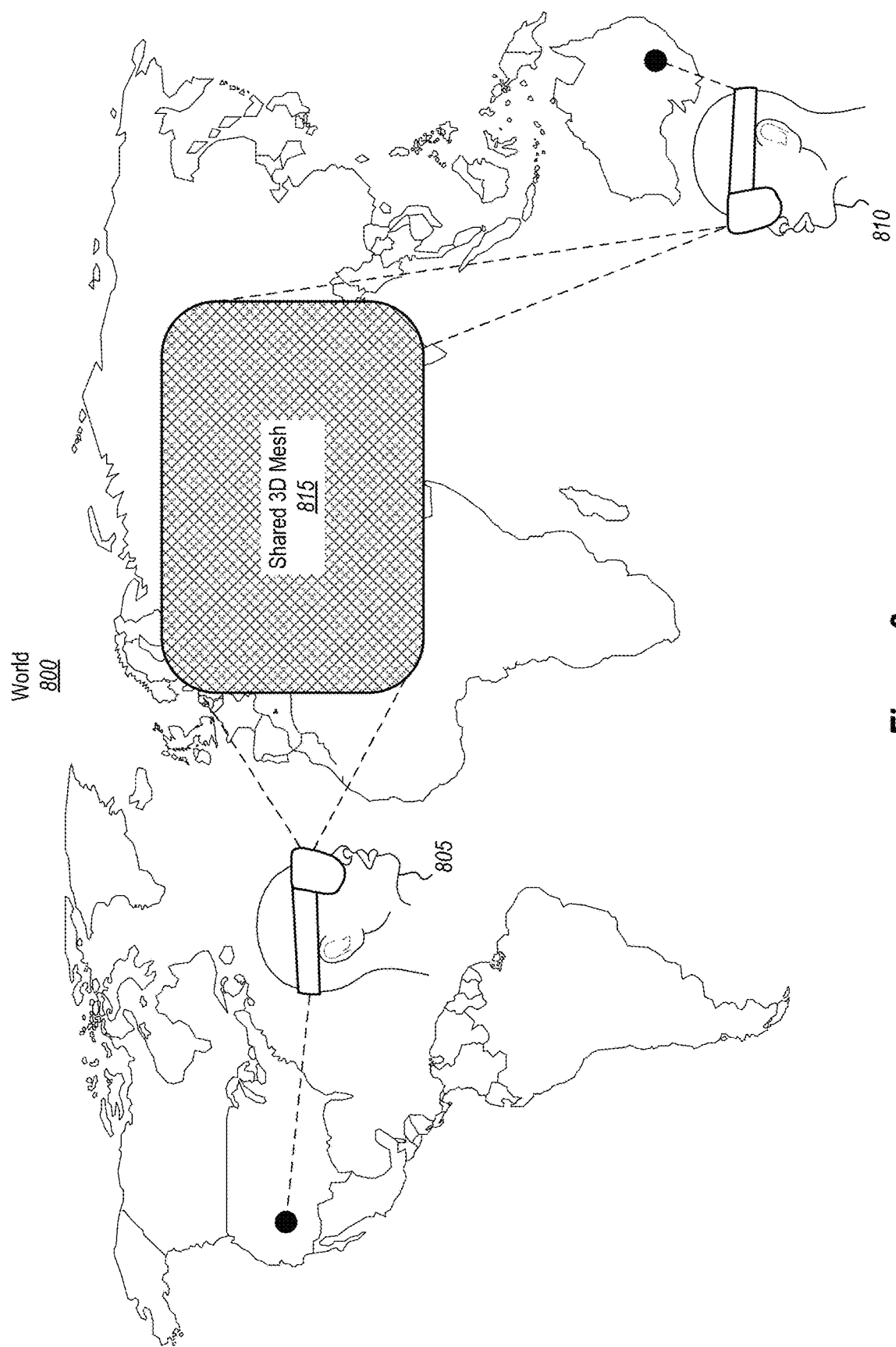
FIG. 8 illustrates that a shared 3D mesh may be accessible anywhere in the world.

FIG. 8 shows an example of a world 800 where a first user 805 and a second user 810 are accessing a shared 3D mesh 815 even though those users are located at different parts of the world 800. In some circumstances, each user is able to view, interact with, share, modify, add to, or delete content from the shared 3D mesh 815. In some embodiments, a single 3D mesh is provided to all users in the world 800 such that each user accesses individualized portions of the single 3D mesh (similar to a puzzle having individualized puzzle pieces). In other embodiments, each user is provided with an individualized 3D mesh that is not accessible by other users.

When a large shared 3D mesh is provided (such as shared 3D mesh 815), users (in some circumstances) are able to contribute mesh data to the shared 3D mesh 815 by scanning their environments and systematically building a 3D mesh of the entire world 800 (similar to how a puzzle is built). As an example, each person may scan a small portion of the world 800 and add that data to the shared 3D mesh 815. When aggregated with everybody else's data (e.g., other symbolic "puzzle pieces"), an entire 3D mesh of the world 800 may be formed.

In this regard, when a VR system is used, holograms of the real-world (as well as of virtual objects) may be accessible even when the VR system is not physically proximate to any real-world items depicted by a particular portion of the 3D mesh. For example, although user 810 is located in Australia, he may nevertheless access (if adequate permissions are available, as described later) the holograms corresponding to user 805's geographic position, and vice versa. When an AR system is used, however, holograms for virtual objects are typically rooted to specific geographic locations. As a result, in some, but not all use scenarios, the AR system is located in a particular geographic region to view the holograms in that location. Thus, user 810 may not (in these example use scenarios) be able to view the holograms located at user 805's geographic location because user 810's AR system is not physically proximate to the corresponding real-world items. In other use scenarios, however, the AR system may be configured to enable a user to view holograms of a location where the user is not physically near, thus somewhat mimicking the abilities of a VR system. Of course, VR systems are able to virtually transplant a user to any new location, without regard to the user's actual physical location. Therefore, the disclosed embodiments are versatile in how users view holograms, regardless of whether an AR system or a VR system is used.

In some instances, two or more 3D meshes overlap the same area(s), but utilize different types and permissions to define the objects in the overlapping 3D meshes to present the same areas in different ways. In this manner, it is possible for competing entities to generate and market their own proprietary 3D meshes to consumers, without having exclusivity over specific regions of the 3D mesh. In other instances, a clearinghouse authority assigns exclusive regions of a shared 3D mesh to different entities, without allowing overlap of the different 3D mesh areas, such as to provide more restricted control over how the 3D mesh will be presented in the different areas of a composite mesh.

Hierarchy of Permissions

The disclosed embodiments provide techniques for automatically assigning permissions to each individual object and/or group of objects represented by a 3D mesh. Such techniques are advantageous because they act to protect this digital information from being used maliciously. For instance, in the context of a world-wide shared 3D mesh (e.g., shared 3D mesh 815 from FIG. 8), a user may not desire other users to access some hologram or other mesh information that is particularly sensitive or private to the user. As an example, the user may elect to upload 3D mesh information about her bedroom so that the user can interact with specific holograms in her bedroom or even interact with a large scale hologram of her entire bedroom (including individualized holograms within her bedroom). In some instances, however, the user will not want other users to learn about the details of her bedroom or the holograms associated with her bedroom. As a result, the disclosed embodiments automatically assign permissions to this information so that only authorized users are permitted to access either the individualized holograms and/or the hologram of the entire bedroom.

Figure 9:
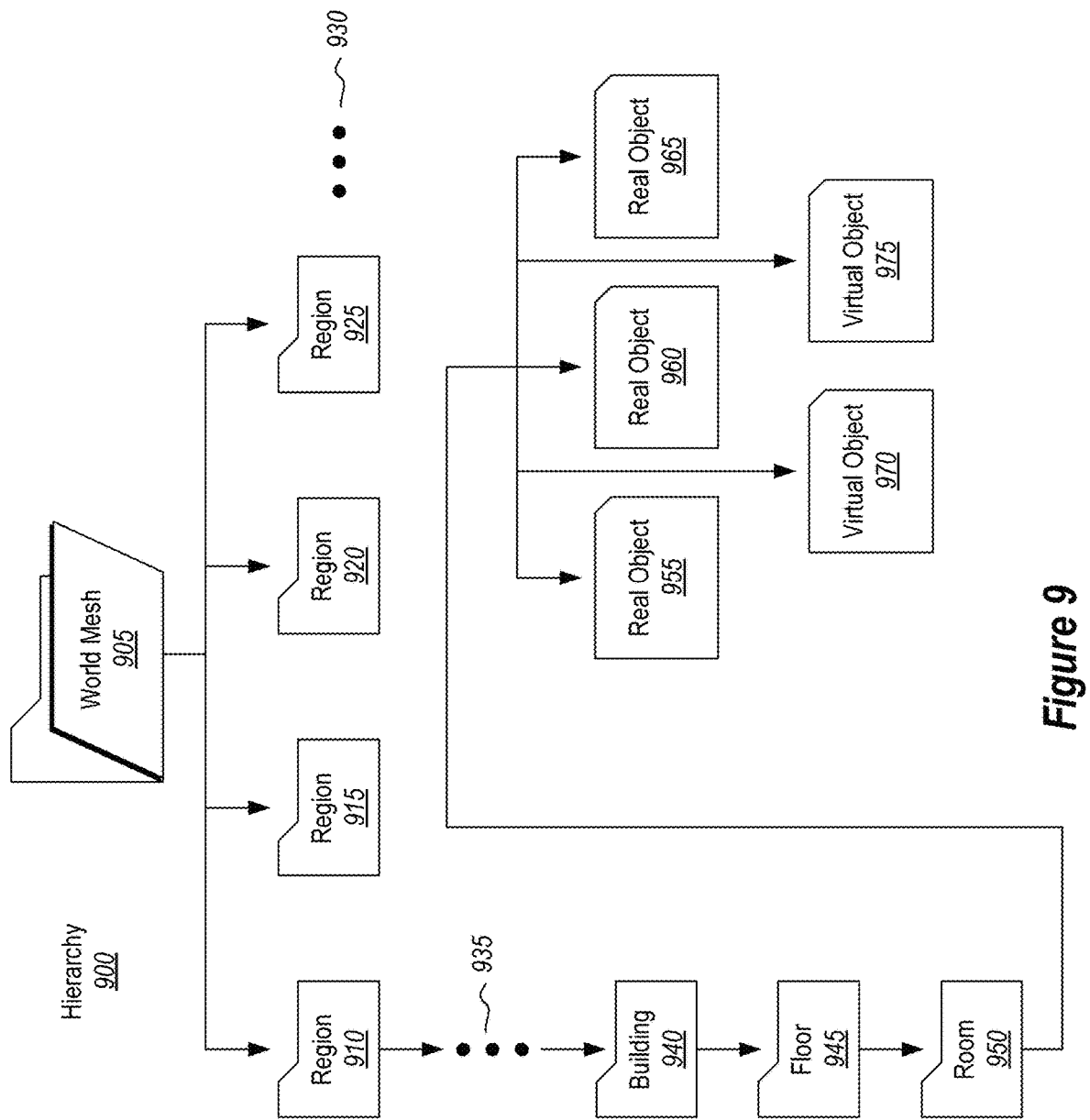
FIG. 9 shows how information in the 3D mesh can be partitioned into different categories, groups, and/or classes.

Accordingly, attention will now be directed to FIG. 9 which shows a permissions hierarchy 900 that includes, at its highest level, a single world mesh folder 905. The world mesh folder 905 (including all of its sub-folders and files) corresponds to the shared 3D mesh 815 of FIG. 8 in that 3D mesh data of shared 3D mesh 815 may be organized using the world mesh folder 905.

World mesh folder 905 includes any number of sub-folders and files. A sub-folder represents a partitioned group of related 3D mesh content while a file represents a specific portion of 3D mesh content (i.e. a specific hologram embodied as a file). As such, each file and/or sub-folder can be symbolically thought of as an individualized puzzle piece that, when combined with the other puzzle pieces, collectively form the world mesh folder 905. Alternatively, each file and/or sub-folder can be viewed as forming a portion of an overarching file system that stores 3D mesh content for the 3D mesh. Of course, this world mesh folder 905 can be dynamically updated by adding, modifying, or removing data at any time. The different portions of the world mesh 905 can be owned by a single entity or by multiple entities (each owning one or more different portion(s)), as described earlier.

It will be appreciated that the world mesh folder 905 may include any quantity of sub-folders, such as, for example, region folders 910, 915, 920, and 925, with the ellipsis 930 demonstrating that any quantity of region folders may be present. An example of a region folder may correspond to, but is not limited to, a continental area or even a country region. To demonstrate, region folder 910 may correspond to 3D mesh information for the North American continent and region folder 915 may correspond to 3D mesh information for the South American continent. The ellipsis 935 demonstrates that each of the region folders may include any number of sub-folders. For example, if the region folder 910 did represent the North American continent, then the ellipsis 935 may indicate the existence of a United States of America sub-folder, a Pennsylvania sub-folder, an Allegheny County sub-folder, a Pittsburgh sub-folder, and so on in a progressively narrowing manner.

By drilling far enough down, eventually region folder 910 is shown as including a building folder 940 which represents 3D mesh information for a specific building. In other embodiments, the top folder of a mesh hierarchy can be a building folder or anther folder of a different granular level.

As with most buildings, the building associated with folder 940 has at least one floor. As such, there is shown a floor folder 945. Drilling further down, floor folder 945 is shown as including a room folder 950. Here, room folder 950 is shown as including files (i.e. holograms) for a number of different objects. Some of these holograms may correspond to virtual representations of real-world items while some may correspond to virtual objects. These holograms are shown by the real object files 955, 960, and 965, as well as the virtual object files 970 and 975.

Figure 10:
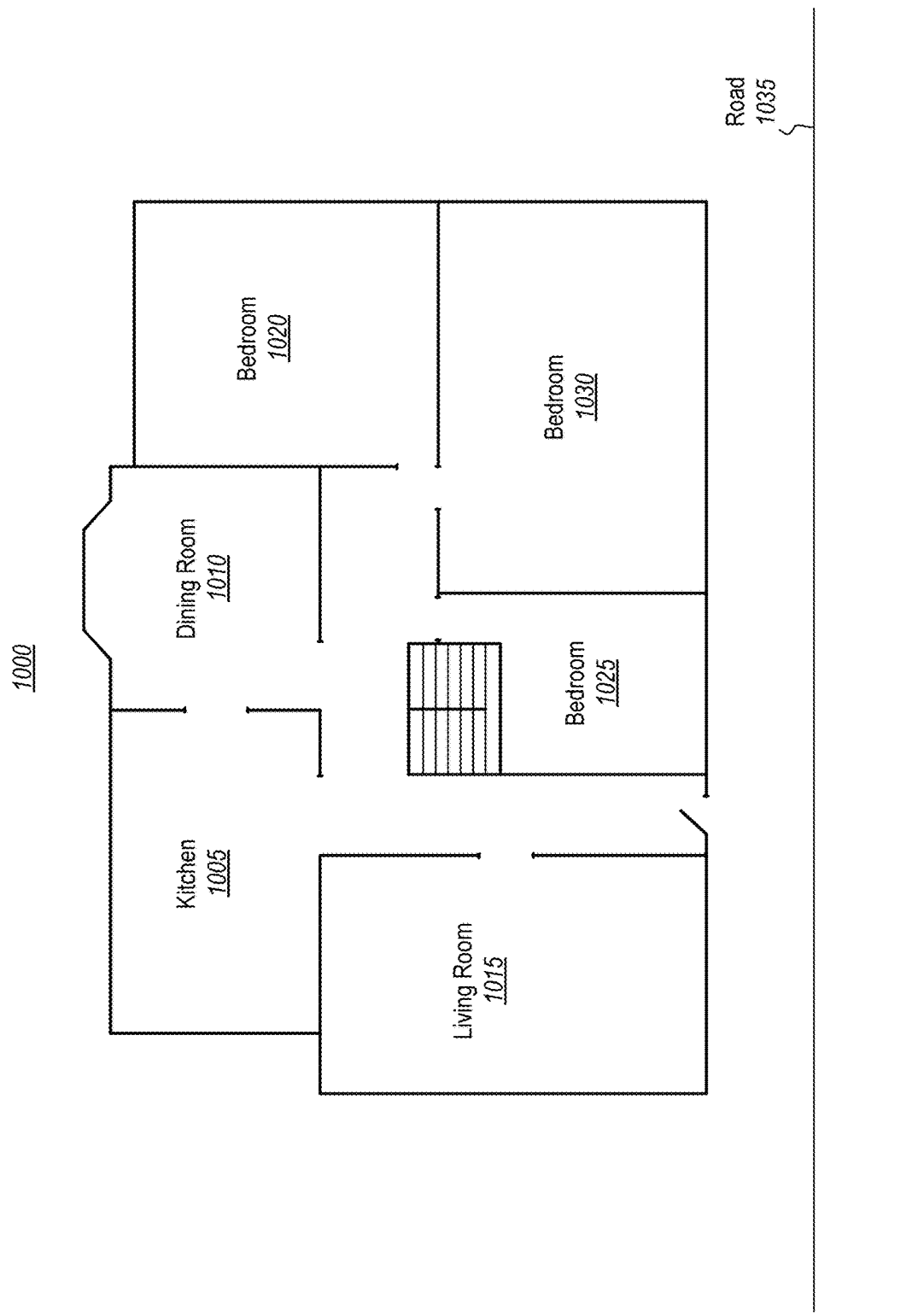
FIG. 10 shows that some of the categories, groups, and/or classes can be based on a floorplan.

FIG. 10 shows an example implementation of the description provided in FIG. 9. In particular, FIG. 10 shows an environment 1000 that includes a floorplan of a building, where the floorplan includes a number of different rooms. To demonstrate, the floorplan includes a kitchen 1005, a dining room 1010, a living room 1015, a bedroom 1020, another bedroom 1025, and yet another bedroom 1030. With reference to FIG. 9, each of these rooms has its own "room" folder in the hierarchy 900 (e.g., room folder 950), and each of these rooms belongs to the same "floor" folder in that hierarchy 900 (e.g., floor folder 945).

Environment 1000 also includes a road 1035. Because road 1035 is separate from the building, road 1035 is associated with a different folder than any of the rooms in the permissions hierarchy 900. However, if one were to navigate upwards through the permissions hierarchy 900, eventually the road 1035 and the rooms will be associated with the same folder because the road 1035 and the rooms are located in the same regional area (e.g., the same city or municipality folder). Eventually, all (or at least most) objects are interrelated because these objects will all be grouped under the world mesh folder 905. It is conceivable, however, that a separate world mesh folder may be created, or even an interstellar mesh folder that has many interstellar type sub-folders (e.g., universe, galaxy, world, star, etc.).

The disclosed embodiments are able, in some instances, to automatically categorize objects into different sub-spaces/ partitions/sub-folders (e.g., rooms). To do so, an area/space/ environment is scanned, and semantic labelling is automatically performed for that area. This scan may be performed by any type of depth detection system to generate point data for that area. Then, surface reconstruction is performed to generate a full surface 3D mesh for the scanned area. Using (1) the point data, (2) the semantic labels, and/or (3) the full surface 3D mesh, the embodiments are able to detect walls, doors, windows, floors, ceilings, and/or any other objects located within the confines of that space. Additionally, if holograms exist for that space (e.g., based on an index associated with the scanned area/attributes of the scanned area), then information about those holograms may also be included or caused to be associated with the 3D mesh. Thereafter, the embodiments generate a floor plan layout by programmatically splitting or partitioning the enclosed areas to identify discrete rooms, as shown in FIG. 10. As such, the multiple partitions, when combined, may collectively represent a floor plan, such as when the scanned area is for a building. If the scanned area is not associated with a building (e.g., the scanned area is associated with an outdoor park), then similar procedures may be used to categorize different objects into different folders (e.g., the park may be quartered into north, south, east, and west partitions or other virtual environment regions). As another example, an outdoor area can be partitioned into sub-regions corresponding to geopolitical boundaries or other types of boundaries. For instance, an area can be partitioned based on continent, country, city, and/or municipality maps, or any other pre-designated boundary/region. As such, a city map may be referenced in order to divide or partition holographic information so that the holographic information correlates with established geopolitical boundaries.

Figure 11:
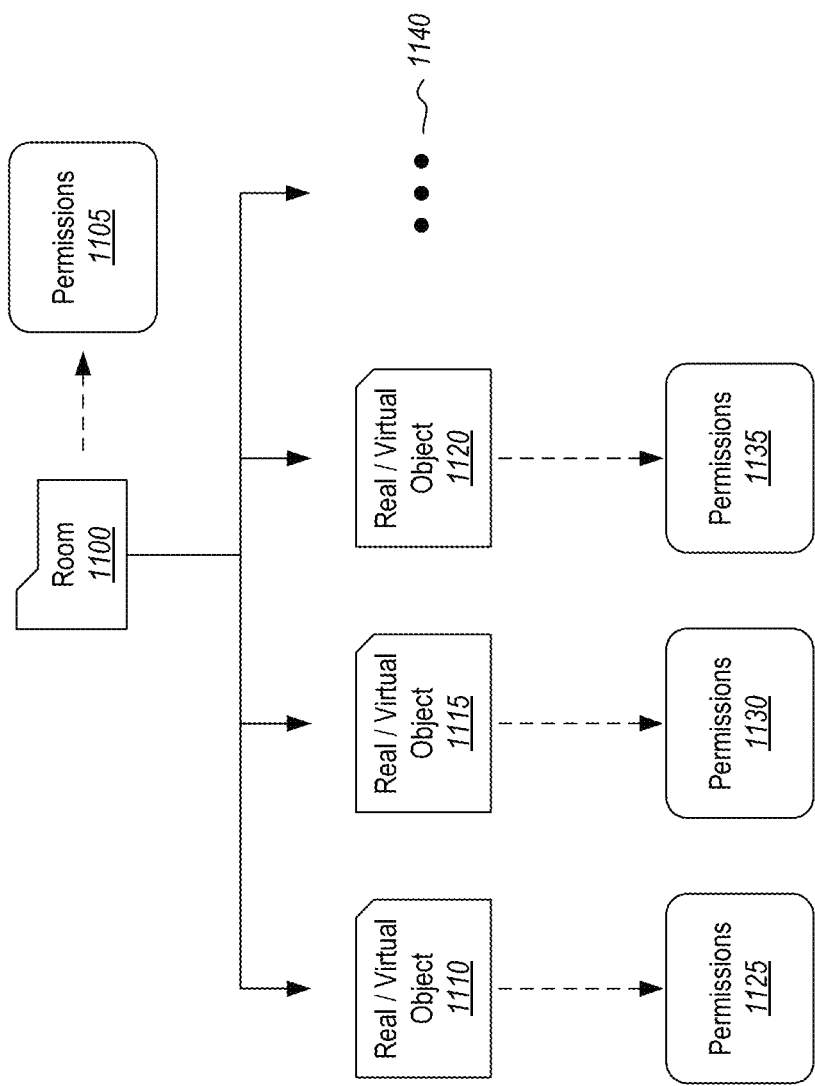
FIG. 11 demonstrates how permissions may be assigned to individual objects or to groups of objects (e.g., the objects associated with a room).

FIG. 11 shows that each hologram (e.g., file) and each group of holograms (e.g., folder) may be assigned permissions. To demonstrate, room folder 1100 may be assigned permissions 1105 such that all sub-folders and/or objects/ files included within room folder 1100 will be assigned either the same permissions 1105 or will be restricted to a permissions level that is at least the same level or a higher/ stricter level as permissions 1105. As an example, consider a scenario in which permissions 1105 corresponds to a medium-tier permissions level. Consequently, all files and sub-folders included within room folder 1100 will be required to at least have a medium-tier permissions level. Of course, the permissions may be stricter (e.g., a high-tier permissions level), but they may not be lower. In this manner, a permission for a folder establishes a lowest acceptable threshold permissions level that is allowed for any files or sub-folders in that folder.

Additionally, or alternatively, each hologram (i.e. file) may be assigned an individualized permissions. To illustrate, real/virtual objects 1110, 1115, and 1120 may be assigned permissions 1125, 1130, and 1135 respectively. The ellipsis 1140 demonstrates that any number of folders and/or files may be included in the room folder 1100, each potentially with its own corresponding permissions. Consequently, the disclosed embodiments are able to categorize any number of objects/holograms into one or more groups based on a determined object type for that object. As such, one permissions level may apply to all the objects in a particular group while a different permissions level may apply to only a subset of objects in the particular group. It will be appreciated that the permissions assigned to one "group" of files (i.e. a folder) may be different than the permissions assigned to another group of files. Consequently, the corresponding holograms in the first group may be accessible (e.g., viewable and/or interactive) in a different manner than the corresponding holograms in the second group as a result of the difference between the permissions.

Optionally, users may also be assigned to different "user groups" for permission control. For example, users belonging to one group may have access to medium-tier permissions while users in another group may have access to low-tier or high-tier permission. Thus, in some embodiments, users can access information provided in a permissions hierarchy based on their respective user groups.

In some instances, the user permissions correspond to authorizations granted to a user based on a user credential. The user credential can be a user entered credential (e.g., password) or a key associated with the user and which is detectable based on physical attributes of the user (e.g., biometric identifiers, such as retina scanners). In some instances, the key granting permissions to a user are tied to a particular device, such as a particular HMD, which the system will automatically associate with different permissions. The various permission data structures (e.g., permissions 1105, 1125, 1130, 1135) define what users and/or devices are authorized to access the different virtual objects and mesh environments, as well as what rights are granted to those users/devices for accessing and/or interacting with the virtual objects and mesh environments.

Figure 12:
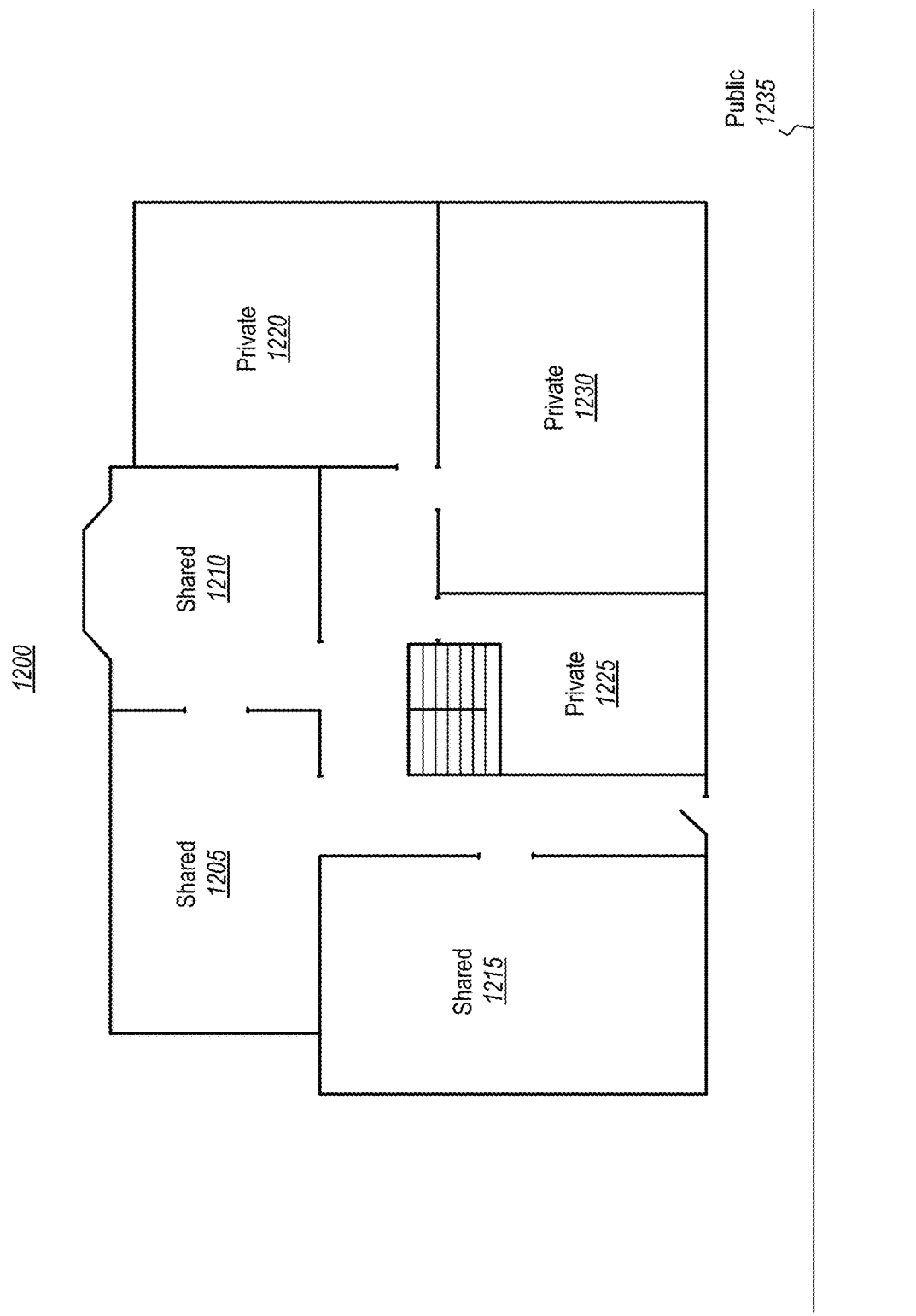
FIG. 12 illustrates how sub-spaces (e.g., rooms) may be assigned different permission categories, such as, for example, public permissions, shared permissions, or private permissions.

FIG. 12 shows an example of some of the permissions that may be assigned to each area (e.g., folder). In particular, FIG. 12 shows an environment 1200 that is similar to environment 1000 from FIG. 10. Kitchen 1005 has been assigned a "shared" permissions 1205, dining room 1010 has been assigned a shared permissions 1210, living room 1015 has been assigned a shared permissions 1215, bedroom 1020 has been assigned a "private" permissions 1220, bedroom 1025 has been assigned a private permissions 1225, and bedroom 1030 has been assigned a private permissions 1230. Additionally, road 1035 has been assigned a "public" permissions 1235.

Because objects can be organized into different groups, there can be circumstances in which multiple objects having the same object type may actually have different permissions solely because they belong to different groups. As an example, consider a chair object. This chair can be located in the bedroom 1020 from FIG. 10, and a similar chair can be located in the living room 1015. As shown in FIG. 12, bedroom 1020 was assigned a private permissions 1220 while living room 1015 was assigned a shared permissions 1215. Therefore, the chair in bedroom 1020 will be assigned the private permissions 1220 while the chair in living room 1015 will be assigned the shared permissions 1215.

As discussed throughout this disclosure, the embodiments are able to utilize machine learning when categorizing or grouping objects together (e.g., to identify that a particular set of objects belong to a bedroom, a living room, or an office). Furthermore, the disclosed embodiments are able to automatically assign permissions based on these group types. As a brief example, through machine learning, it can be determined that bedroom content should typically be classified as having private permissions. In contrast, it can be determined that a hallway should typically be classified as having shared permissions. Similarly, it can be determined that a sidewalk should typically be classified as having public permissions. In this regard, machine learning may be used not only to automatically identify/segment objects, but also to automatically group objects and assign permissions to those objects. Therefore, by analyzing the attributes of objects, the embodiments are able to determine and assign a permission for each object and/or for each group of objects.

Figure 13:
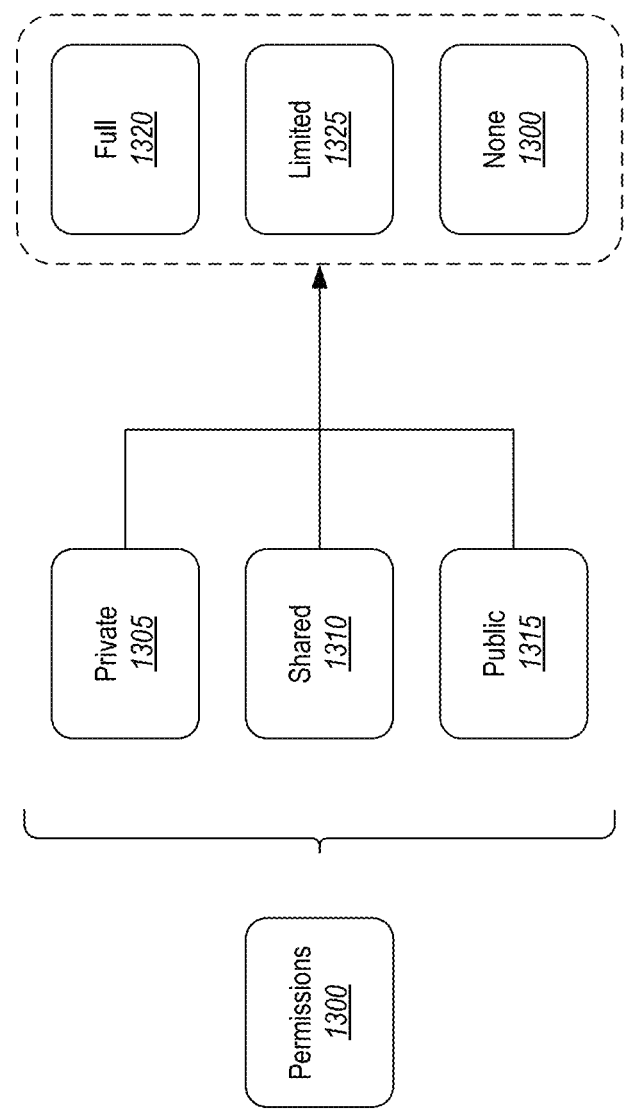
FIG. 13 provides another rendition of the different permission categories or levels that are available.

FIG. 13 more fully describes some of the available permission levels/types. Specifically, FIG. 13 shows that permissions 1300 may include private permissions 1305, shared permissions 1310, and public permissions 1315.

Private permissions 1305 correspond to individual file or folder ownership. For example, an individual may own a hologram of her bed, or she may own the hologram of her bedroom. As such, the individual may retain complete control in granting access to the files or folders for those holograms.

Shared permissions 1310 correspond to a limited or defined group ownership of a file or a folder. For example, a corporation, household, academic institution, etc. may own a specific work, home, or academic hologram, or they may own a hologram of an office, house room, or classroom. The employees, family members, or professors/students may have permissions to access those holograms while other (unauthorized) users might be restricted from accessing the corresponding virtual objects and/or 3D mesh environment areas.

Public permissions 1315 correspond to an open ownership (or even no ownership at all) of a file or folder. For example, a hologram of a public park or of a specific hologram that is projected into the park may be publicly available to any user. Therefore, in contrast to the limited group ownership for shared permissions 1310 or to the very limited/individualized ownership for private permissions 1305, public permissions 1315 allows any member of the public to access the corresponding holograms.

It will be appreciated that the private permissions 1305 is higher, or rather stricter, than the shared permissions 1310. Similarly, the shared permissions 1310 is stricter than the public permissions 1315.

Using FIGS. 10 and 12 as examples, road 1035 was assigned the public permissions 1235 because a road is open to the general public. As such, any user is able to view content that is associated with the road. In contrast, kitchen 1005 was assigned the shared permissions 1205 because only a defined or limited number of users are able to access the content associated with the kitchen 1005 (e.g., only family members living in the home with kitchen 1205). Relatedly, bedroom 1020 was assigned the private permissions 1220 because any holograms associated with the bedroom 1020 are strictly controlled due to the potentially private/sensitive nature of bedroom content.

Returning to FIG. 13, different access levels within each of the permission categories are also available. For example, within any of the private permissions 1305, the shared permissions 1310, or the public permissions 1315, users may be afforded varying degrees of access rights (e.g., viewing rights, sharing rights, interacting rights, modifying rights, adding rights, or deleting rights). In particular, full access 1320, limited access 1325, or no access 1330 are shown. As such, different files and folders may be provided not only with different permissions levels, but also with different access rights within each of those permission levels.

By way of example and not limitation, some users will be provided no access 1330, meaning that those users will not be able to view (or they are provided with a censored view as described later) and/or they are not able to edit or otherwise interact with any of the related holograms. Users provided with limited access 1325 may be able to view and/or interact with the related holograms, but they cannot modify, add, share, or delete content. Finally, users provided with full access 1320 may be able to view, dynamically interact with, share, modify, add to, or delete the related holograms.

As another example, consider a hologram located in a park. Because the hologram is in a public area, it will be provided public permissions, meaning that any user will be able to have at least some access to the hologram. In many instances, however, the creator of the hologram will only want the users to be able to view and interact with the hologram. As such, the hologram may be assigned (either automatically or manually) a public permissions and a limited access permissions. In this manner, the disclosed embodiments allow customized permissions to be assigned to each hologram.

Accordingly, provided herein are techniques for automatically setting privacy information in a mixed-reality environment. These techniques include a process of scanning a space and then automatically providing semantic labeling for these spaces. Additionally, these techniques include automatically setting security groups (e.g., permission levels) for these spaces. Some embodiments also include retrieving and updating user content in these spaces. By automatically scanning, generating, and establishing privacy zones, the process of generating and sharing content can be carefully controlled.

Accessing Objects Based on the Assigned Permissions

Attention will now be directed to FIGS. 14A through 14D. These figures provide different example scenarios where different users are accessing different holograms based on the assigned permissions for those holograms. Each of these users are associated with different attributes (e.g., user account, age, status, rank, etc.). Based on the user attributes and the assigned permissions for the holograms, some users will be able to access certain holograms while other users will not be able to access those holograms. Although these figures illustrate scenarios in which a HMD is being used to view holographic information, it will be appreciated that any type of computing device may be used, even computing devices that use a 2D screen to render content. As such, even a 2D screen may be used to provide a birds-eye view (or other type of view) of a virtual object and/or to provide the ability to view, share, interact with, modify, add, delete, or otherwise edit the virtual holographic information.

Figure 14A:
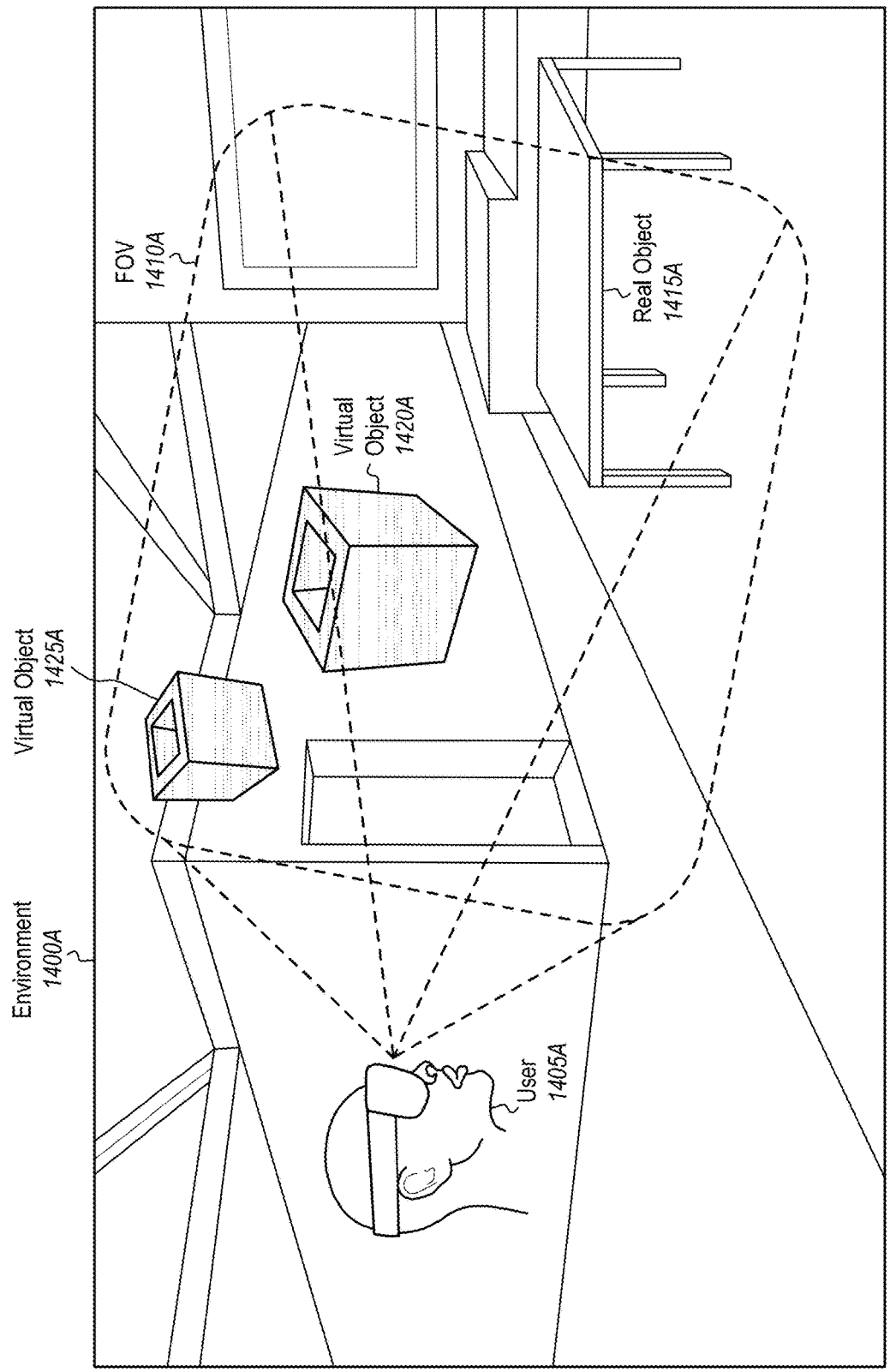
FIGS. 14A, 14B, 14C, and 14D show how different users will be able to access different content based on their respective permission levels.

FIG. 14A shows an example environment 1400A in which a user 1405A is interacting with the environment 1400A by viewing the environment 1400A through a HMD's field of view (FOV) 1410A. Environment 1400A includes a real object 1415A, a first virtual object 1420A, and a second virtual object 1425A. If environment 1400A is an AR environment, then the first and second virtual objects 1420A and 1425A are holograms projected into a real-world environment that includes the real object 1415A. If environment 1400A is a VR environment, then the real object 1415A is actually a hologram virtually representing a real-world object, and the first and second virtual objects 1420A and 1425A are also holograms. As shown, user 1405A is able to at least partially access these holograms because they are viewable in the FOV 1410A.

Figure 14B:
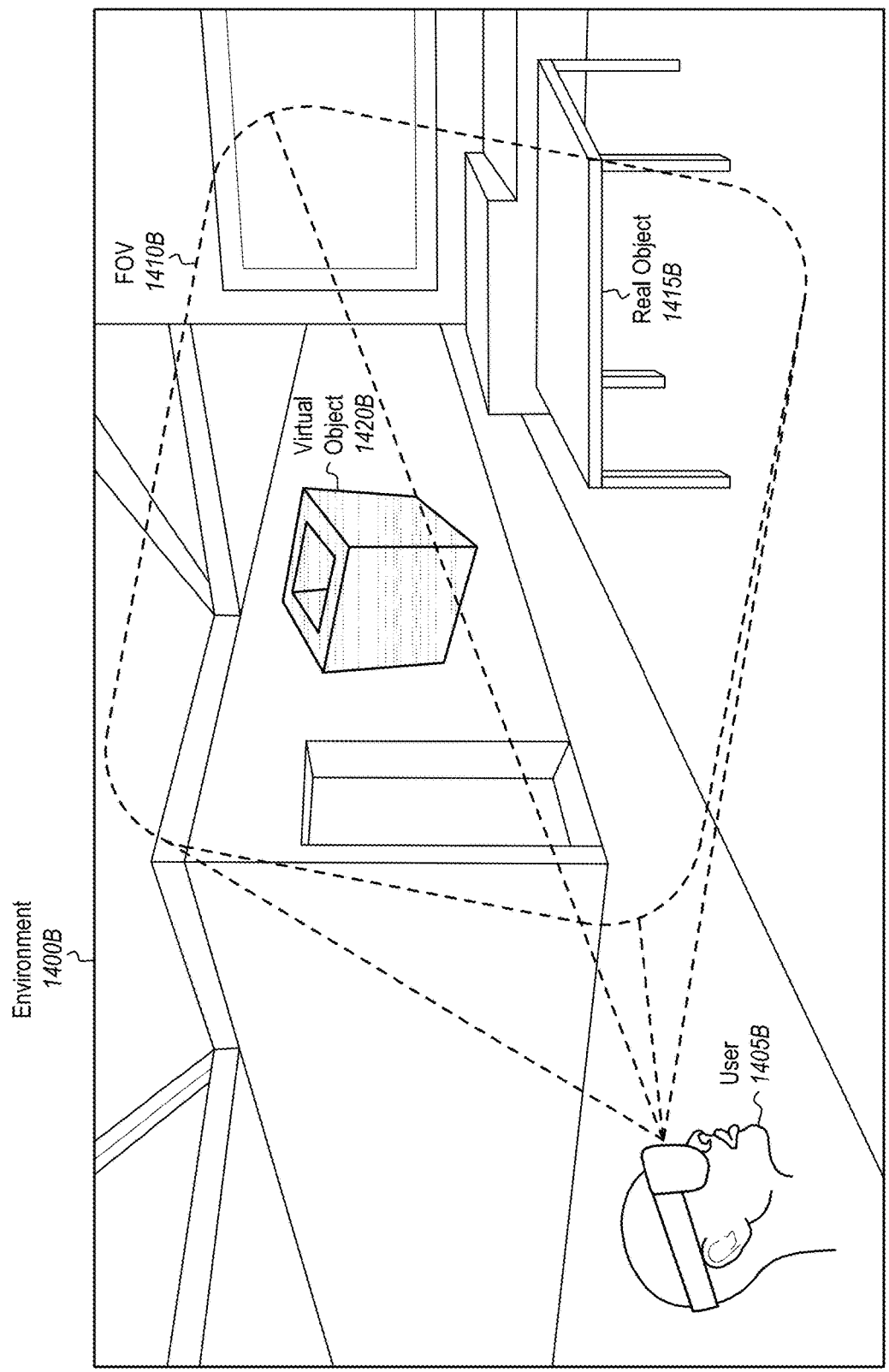

FIG. 14B illustrates environment 1400B which is similar to environment 1400A from FIG. 14A. Here, however, a different user 1405B is interacting with environment 1400B through the FOV 1410B. In this scenario, environment 1400B includes real object 1415B (corresponding to real object 1415A from FIG. 14A) and a single virtual object 1420B (corresponding to the first virtual object 1420A). While user 1405B does have at least some access to virtual object 1420B (because it is viewable in FOV 1410B), user 1405B is not permitted access to the second virtual object 1425A from FIG. 14A. Consequently, user 1405B is not able to view, interact with, share, modify, add, or delete content associated with the second virtual object 1425A. From this, it is apparent that even though two users might be in the same environment, those users will not necessarily be able to access the same holograms. In fact, the disclosed embodiments are able to selectively control which users will be able to access which holograms by assigning permissions to the holograms.

Figure 14C:
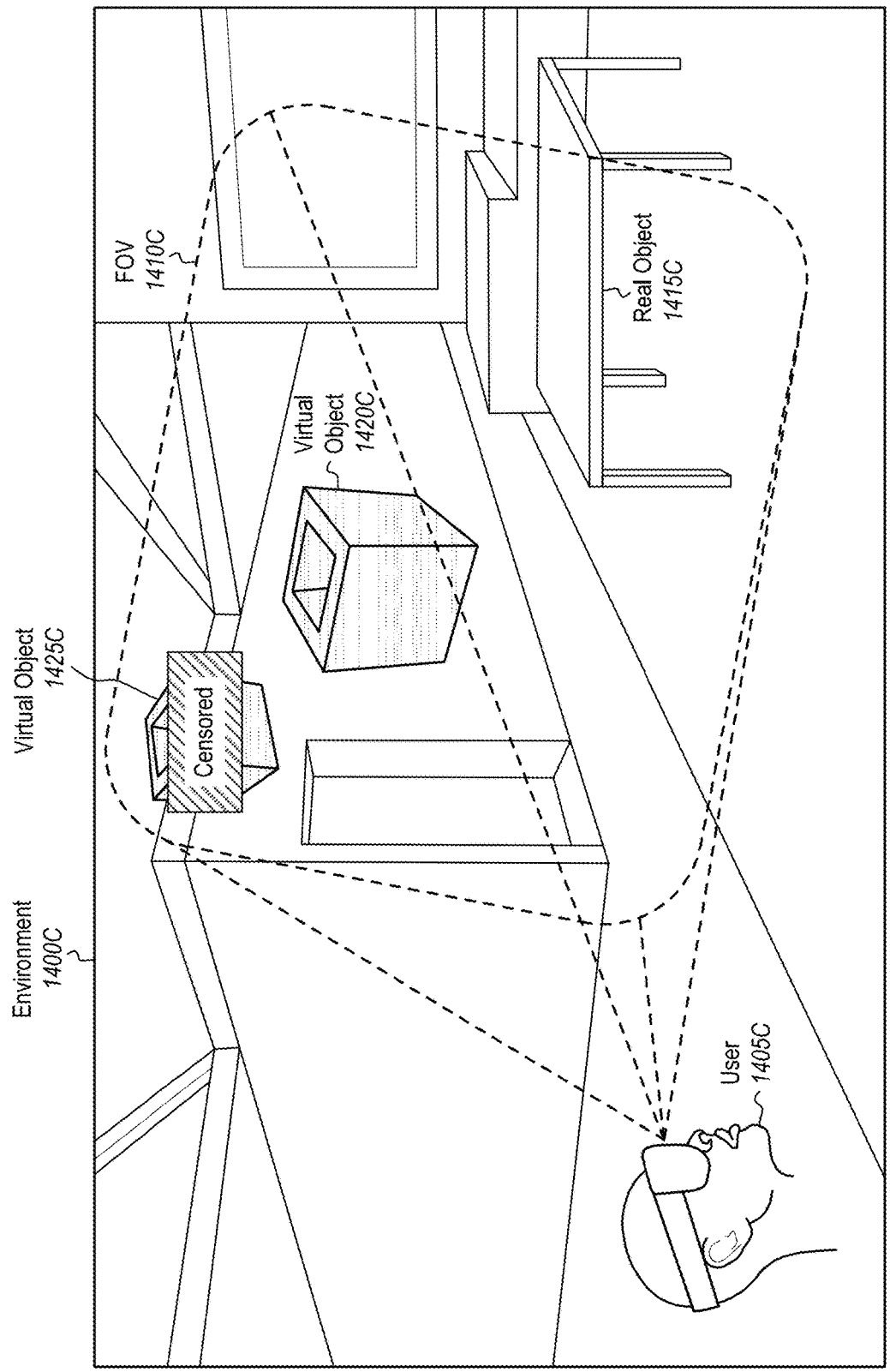

In some instances, it may be desirable to notify a user that a hologram is present in the environment, while still restricting the user from interacting with or having the ability to completely view the hologram. To demonstrate, FIG. 14C shows an example environment 1400C which is similar to the environments 1400A and 1400B from FIGS. 14A and 14B respectively. Here, user 1405C is interacting with environment 1400C via FOV 1410C. Environment 1400C includes a real object 1415C, a first virtual object 1420C, and a partially censored second virtual object 1425C. By censoring the second virtual object 1425C, user 1405C is aware that another hologram is available but that he does not have permissions for that hologram.

Therefore, in circumstances where a requesting entity (e.g., a user or a computer system) is granted only limited access to a hologram (e.g., as shown in FIG. 14C), then the hologram will either not be viewable on the display (e.g., as shown in FIG. 14B) or is at least partially censored (e.g., as shown in FIG. 14C). In this regard, a user may be provided with only a filtered and/or alternative view of the hologram.

Figure 14D:
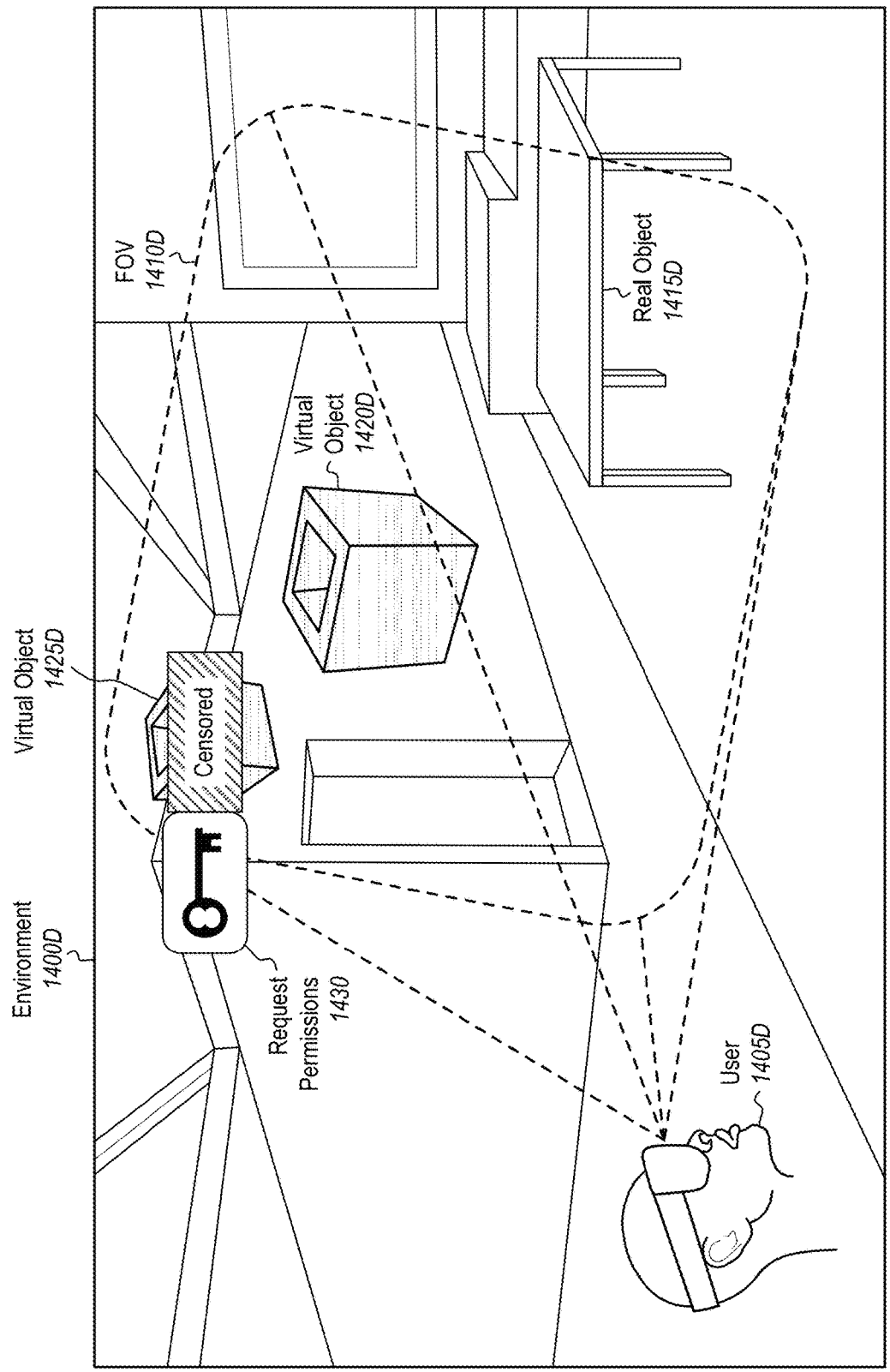

FIG. 14D shows a scenario in which a user is able to request permissions to access a censored hologram. In particular, environment 1400D shows a user 1405D interacting with the environment 1400D via FOV 1410D. Here, environment 1400D includes a real object 1415D, a first virtual object 1420D, and a censored second virtual object 1425D. In this scenario, however, user 1405D is presented with a selectable request permissions option 1430. By selecting the request permissions option 1430, a request can be generated on behalf of user 1405D to request that the censored state of the second virtual object 1425D be removed such that it is no longer censored. Therefore, although certain holograms may have an initial permissions assigned to them, these permissions can later be changed as needed.

Additionally, by selecting the request permissions option 1430, user 1405D may be provided with different levels of permissions. In some instances, user 1405D will be granted permission to view the second virtual object 1425D but not granted interactive permissions. In other instances, user 1405D will be granted view and interactive permissions. In this regard, the embodiments are able to selectively enable interactive properties for objects by adjusting the permissions for those objects.

Example Methods

FIGS. 15 through 19 refer to a number of methods and method acts that may be performed. Although the method acts may be discussed in a certain order or illustrated in a flowchart as occurring in a particular order, no particular ordering is required unless specifically stated, or required because an act is dependent on another act being completed prior to the act being performed.

Figure 15:
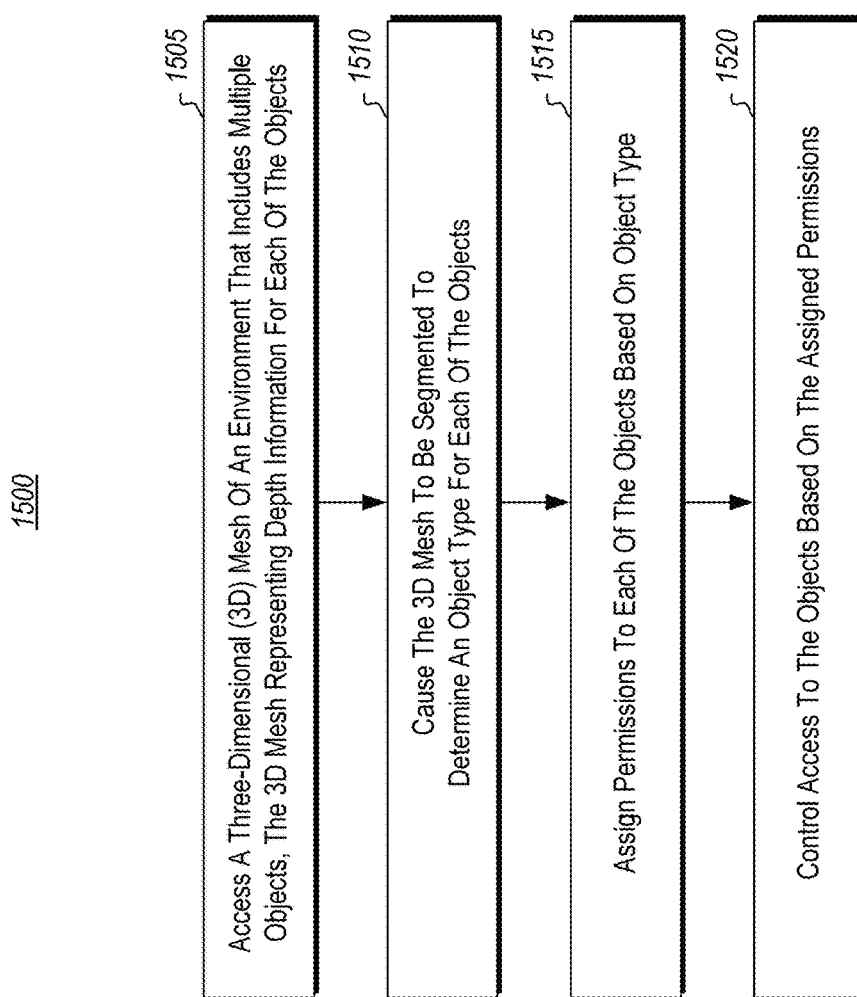
FIGS. 15, 16, 17, 18, and 19 illustrate different flowcharts of example methods for controlling access to objects based on the permissions assigned to those objects.

FIG. 15 shows a flowchart 1500 of an example method for controlling access to virtual objects by assigning permissions to those objects. Initially, a 3D mesh of an environment is accessed (act 1505). As is often the case, the environment is associated with any number of different objects (e.g., real-world objects, virtual representations of real-world objects, or even virtual objects). As such, this 3D mesh represents the depth/contour information for each of those objects. In this regard, the 3D mesh includes information for real-world objects, virtual representations of real-world objects, and/or virtual objects that are projectable into the environment.

Additionally, the 3D mesh can be segmented (act 1510) to determine an object type for each of those objects. For example, FIG. 7 described some of the example object types that may be used.

According to the disclosed embodiments, permissions are assigned to each of these objects in the manner described earlier (act 1515). Consequently, permissions are assigned both to the virtual representations of the real-world objects and to the virtual objects (i.e. to the holograms).

Lastly, access to each of these objects is then regulated using these assigned permissions (act 1520). For example, each user may be provided with a particular user group or credential level. By comparing a user's user group or credentials with the assigned permissions for each object, the embodiments are able to evaluate whether a particular user is permitted to view, interact with, share, modify, add, or even delete content included in the 3D mesh. In this manner, the embodiments provide many valuable functionalities because they help to ensure that data in the 3D mesh is properly protected. As described earlier, these permissions may be assigned automatically via machine learning.

Figure 16:
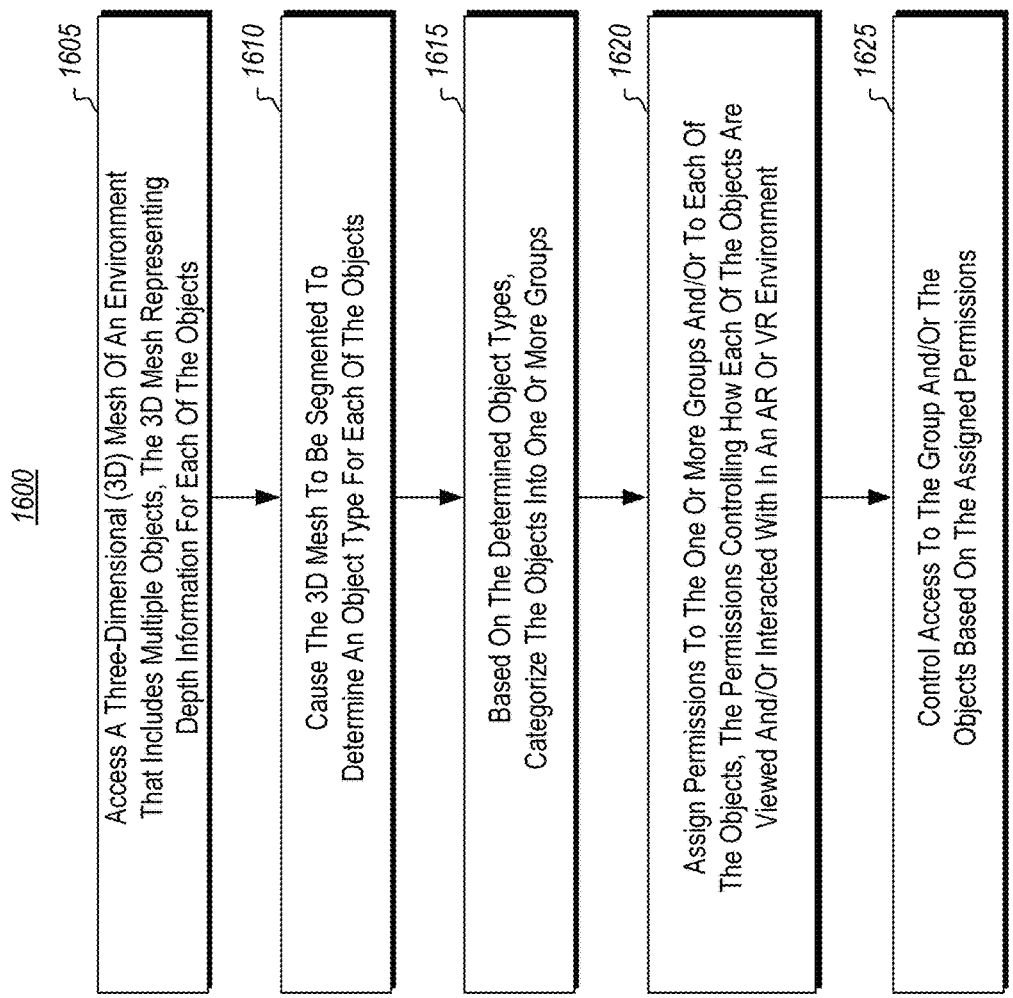

FIG. 16 illustrates another flowchart 1600 of a method for controlling access to virtual content. Similar to flowchart 1500 of FIG. 15, a 3D mesh of the environment is initially accessed (act 1605), and then the 3D mesh is segmented to identify object types (act 1610).

Based on these determined object types, the objects are then categorized into one or more groups (act 1615). For example, FIG. 7 outlined some of the different groups that may be available.

Permissions are then assigned to each group and/or to each of the objects (act 1620). In this manner, the permissions control how each of the objects are accessed (e.g., viewed, interacted with, etc.) in any kind of mixed-reality environment, including an AR environment or a VR environment. FIG. 11 demonstrated how permissions may be assigned to groups and/or individual objects. Finally, access to the group and/or the individual objects is then controlled based on the assigned permissions (act 1625).

Figure 17:
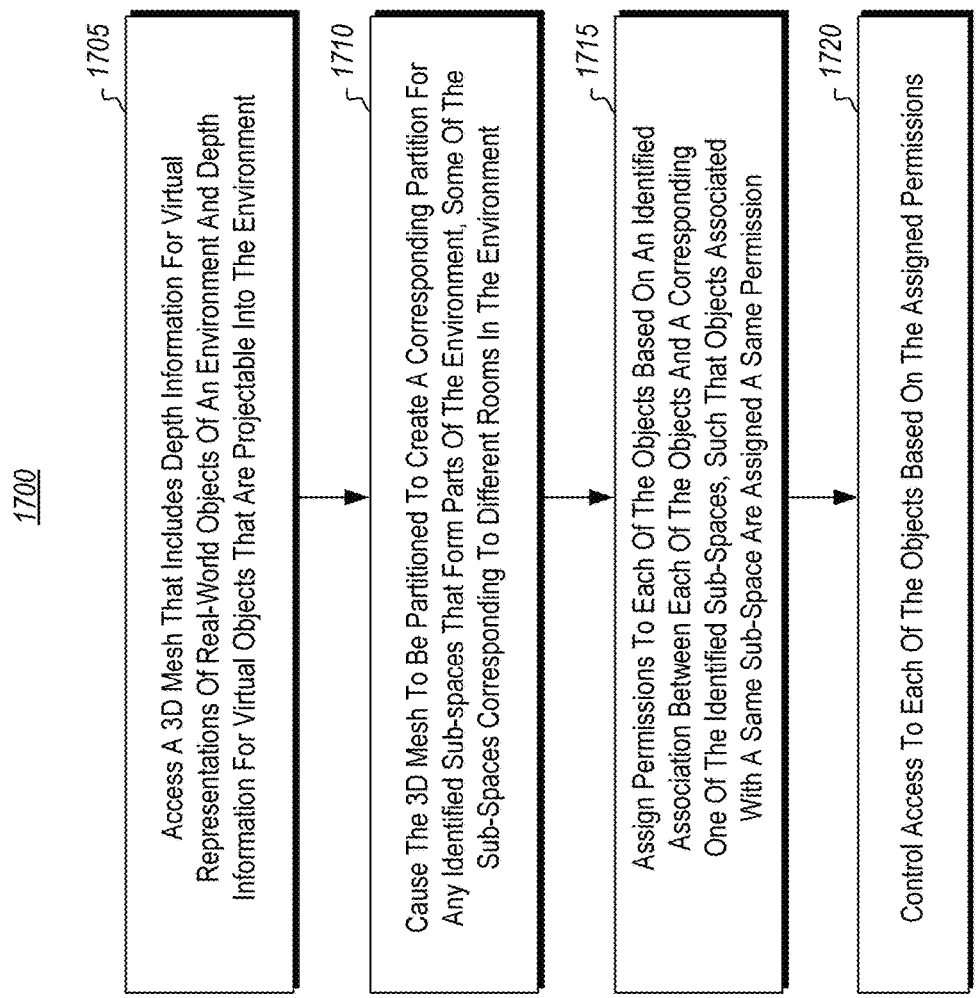

FIG. 17 presents a flowchart 1700 of an example method that partitions a 3D mesh into different sub-spaces (e.g., the rooms of the building shown in FIG. 10). Such a method is beneficial because it enables entire areas to be cordoned off and restricted from being accessed by certain users, thereby enhancing security measures. As described earlier, these processes may be performed automatically through machine learning.

In this method, the 3D mesh is initially accessed in a manner similar to that which was described above (act 1705). Then, the 3D mesh is partitioned (e.g., either in a cloud environment such as by the service 610 in FIG. 6 or by an HMD such as HMD A in FIG. 6) to create multiple partitions (act 1710). Each partition corresponds to an identified sub-space that, when combined with the other sub-spaces, form the entire environment. Using FIGS. 9 and 10 as references, the building in FIG. 10 has been subdivided into a number of different rooms (e.g., the kitchen 1005, the living 1015, etc.). Each room constitutes a "sub-space" as described above. Furthermore, each room is provided with its own independent partition in a permissions hierarchy. To demonstrate, the kitchen 1005 may correspond to the room folder 950 from FIG. 9. In this manner, each sub-space corresponds to a folder in the permissions hierarchy 900.

In addition to the above acts, permissions are then assigned to each of the objects (act 1715). According to this embodiment, determining which object is assigned which permission is based on an identified association between each of the objects and a corresponding one of the identified sub-spaces. In other words, if a chair object is located in the kitchen 1005 of FIG. 10, then the chair object will be grouped with the kitchen 1005 and will be provided with at least the same permissions (though higher/stricter is possible) as any other objects that are also grouped with the kitchen 1005. In this manner, objects associated with the same sub-space (e.g., the kitchen 1005) will be assigned at least the same permissions.

Access to each of these objects is then controlled based on the assigned permissions (act 1720). To illustrate, all objects associated with the kitchen 1005 of FIG. 10 will be controlled in the same manner, and all objects associated with the bedroom 1020 will be controlled in the same manner. As such, the bedroom 1020 objects will be controlled differently than the kitchen 1005 objects because of the different permissions.

Figure 18:
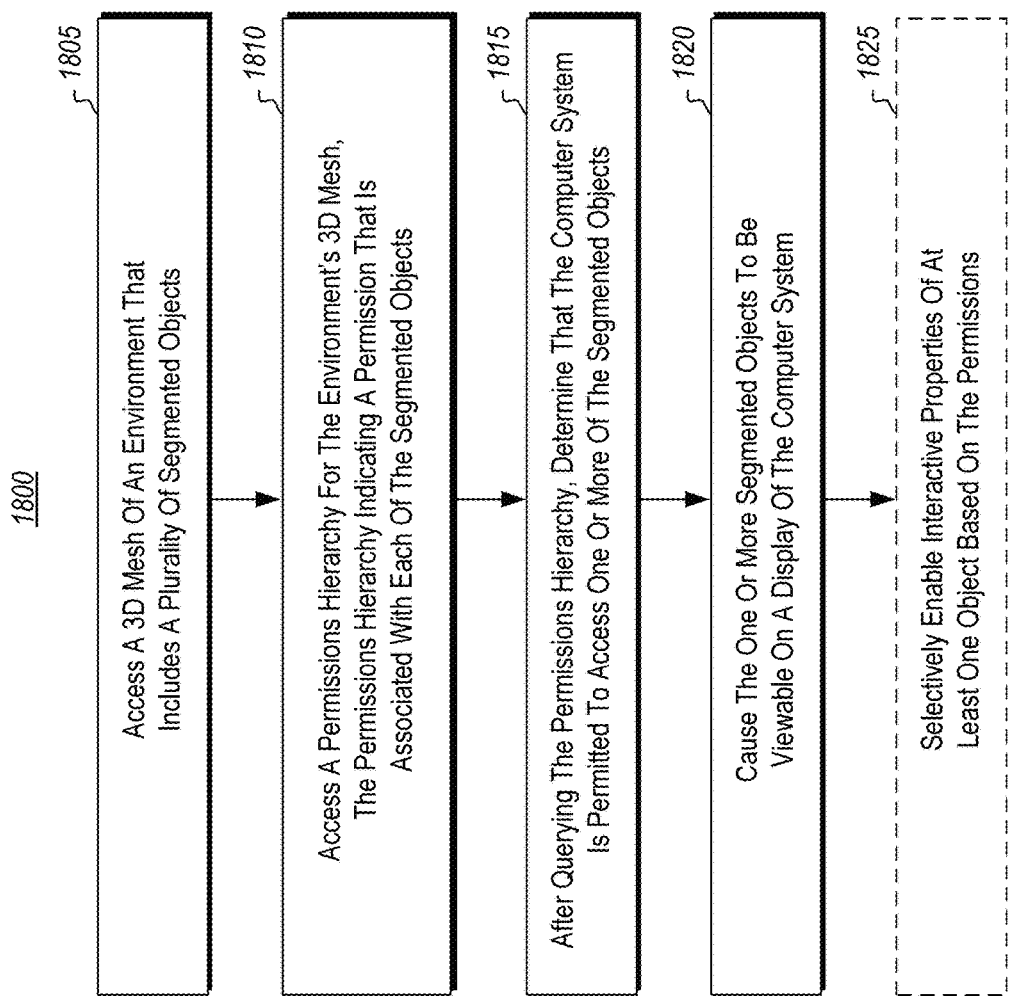

FIG. 18 illustrates a flowchart 1800 of an example method for determining whether a user will be able to access a certain hologram or a group of holograms. Initially, a 3D mesh is accessed (act 1805).

Next, a permissions hierarchy for the environment's 3D mesh is accessed (act 1810). This permissions hierarchy (e.g., permissions hierarchy 900 from FIG. 9) indicates a permission that is associated with each of the segmented objects.

After querying the permissions hierarchy, a determination is made as to whether the requesting entity (e.g., a user or a computer system) is permitted to access certain segmented objects (act 1815). The act of determining whether an entity is permitted to access certain virtual content may include acts of identifying the user and or computer system, such as by requesting/analyzing user credentials or other login information and/or by examining device identifiers and/or by performing biometric analysis of the user.

An example will now be provided to illustrate a benefit of associating different permissions to different virtual content. For instance, consider a scenario in which there are a number of different holograms in the bedroom 1020 of FIG. 10. In some situations, the owner of the bedroom 1020 may not want another user to view those holograms because they may be personal to the owner. If a guest walks into the bedroom 1020, the owner may also not want the guest to view those holograms even though the guest is physically in the room. Therefore, the permissions hierarchy provides a valuable benefit because it regulates which users are permitted to access which content.

In some embodiments, querying the permissions hierarchy is performed by (1) collecting information associated with a user or a computer system and (2) determining, based on the collected information, whether the user or computer system is permitted to access the holograms. Optionally, the collected information may include a determined user permission or user group of a user who is using the computer system. As another option, the collected information may include a determined device type or device attribute of the computer system.

In some situations, the owner of a hologram may determine that it is acceptable for other users to view that hologram by setting the permissions accordingly. In such circumstances, the holograms will be viewable or even interactive on the guest computer system's display (act 1820).

Act 1825 is an optional act as shown by its dashed border. Here, this act includes the process of selectively enabling interactive properties of a hologram based on its permissions. In other words, the guest may also, in addition to simply viewing the hologram, interact with the hologram, or potentially share the hologram, modify the hologram, add to the hologram, or delete the hologram.

Figure 19:
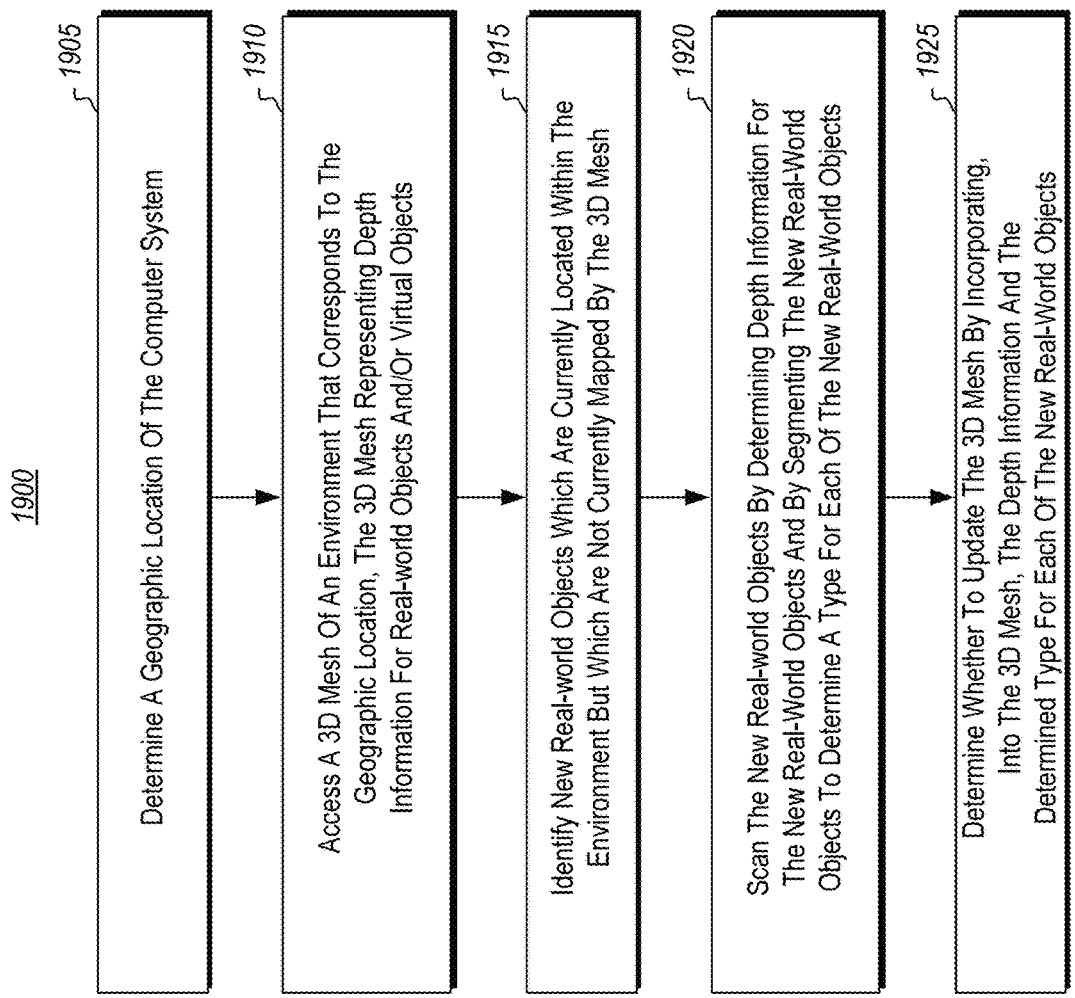

FIG. 19 illustrates yet another flowchart 1900 of an example method. This method relates to techniques for determining whether other users are permitted to share, modify, update, add, or even delete content from a particular portion of the 3D mesh, particularly when new real-world objects are currently in an environment but they do not have 3D mesh information in the existing 3D mesh.

As described above, this process is particularly relevant when a new real-world object is encountered. Initially, a geographic location of the user's computer system is determined (act 1905). This may be achieved via any means, such as, for example, use of a GPS system or even a triangulation method using cell towers.

Based on the geographic location, a 3D mesh of an environment that corresponds to the geographic location is accessed (act 1910). Just as before, this 3D mesh represents depth information for real-world objects and/or virtual objects located within the environment.

Next, one or more new real-world objects which are currently located within the environment but which are not currently mapped by the 3D mesh are identified (act 1915). This act may be performed by identifying a discrepancy between the 3D mesh and a new 3D mesh that is generated by scanning the environment. For example, by scanning the environment and creating a new 3D mesh, and then by comparing that new 3D mesh to the existing 3D mesh, the computer system can identify whether any new objects are present or whether any old objects that used to be present are no longer present.

To generate the new 3D mesh, these new real-world objects are scanned by determining their depth information and by segmenting that depth information to determine a type for each of those new real-world objects (act 1920). In this manner, the disclosed embodiments are able to identify whether the new real-world objects are "appropriate" (described later) to add to the 3D mesh. For example, act 1925 includes a step of determining whether to update the 3D mesh by incorporating, into the 3D mesh, the depth information and the determined type for each of those new real-world objects.

Such a process is beneficial because some objects are not suitable or "appropriate" to add to the 3D mesh. Take, for instance, a vehicle parked in a driveway. That vehicle is highly transitory and may not stay at that position for very long. Therefore, adding the vehicle's information to the 3D mesh may be a wasted effort because the vehicle will likely not be present or will not be in the same spot the next time the 3D mesh is accessed. In this manner, when segmenting and classifying a new real-world object, the disclosed embodiments are also able to analyze attributes associated with that new real-world object. If those attributes indicate that the object is sufficiently transitory (e.g., the attributes suggest that the object surpasses a predefined transitory threshold level), then the object's information may not be added to the 3D mesh.

Of course, it will be appreciated that in order to update the 3D mesh, a determination is first made as to whether the user or the user's computer system has adequate permissions to update the 3D mesh. Furthermore, if sufficient permissions are not available or if it is determined that the 3D mesh is not to be updated, then, while the computer system is located within the environment, the computer system may use a temporary 3D mesh. This temporary 3D mesh can be generated by scanning the environment and including the information about the new real-world objects into a new 3D mesh or temporarily into the existing 3D mesh (i.e. temporarily augment the existing 3D mesh). Notably, however, this temporary 3D mesh (or the temporary content added to the existing 3D mesh) will later be deleted such that the actual 3D mesh is not permanently updated. Such a process is beneficial because it allows the user to interact with the current objects in an environment while still maintaining security for the actual 3D mesh.

Accordingly, the disclosed embodiments are generally directed to systems, methods, and techniques for automatically protecting virtual content. These processes enable access permissions to be assigned to individual objects and/or groups of objects. By consulting or querying these permissions, a determination can be made as to whether a particular user is permitted to share, view, interact with, add, modify, or delete information in the 3D mesh. In this manner, the embodiments provide a heightened security protocol and provide a controlled and regulated environment.

Example Computer System

Figure 20:
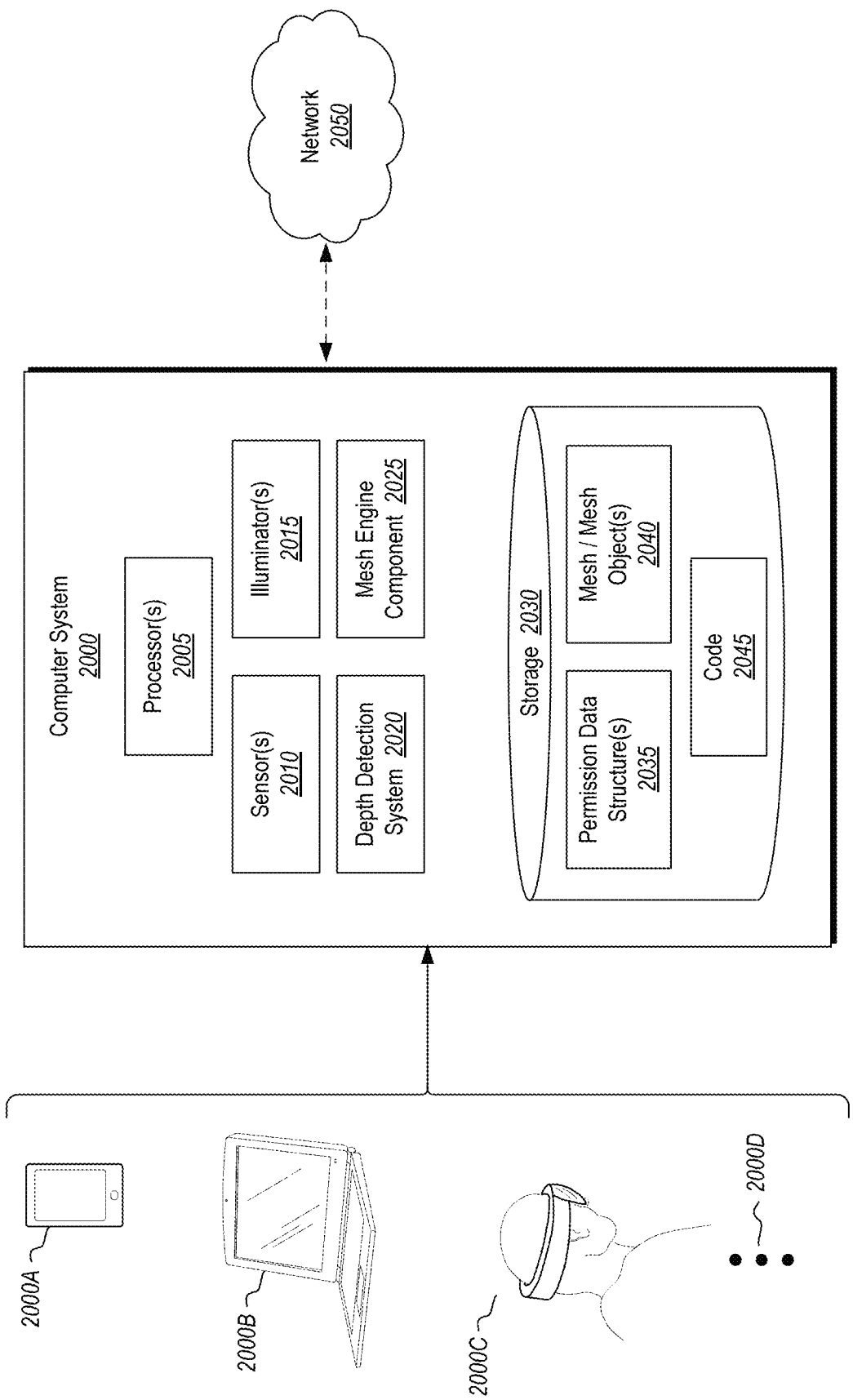
FIG. 20 shows an example computer system that is capable of performing the operations described herein.

Having just described the various features and functionalities of some of the disclosed embodiments, the focus will now be directed to FIG. 20 which illustrates an example computer system 2000 that may be used to facilitate the operations described herein. In particular, this computer system 2000 may be in the form of the HMDs that were described earlier.

In fact, the computer system 2000 may take various different forms. For example, in FIG. 20, the computer system 2000 may be embodied as a tablet 2000A, a desktop 2000B, or a HMD 2000C. The ellipsis 2000D demonstrates that the computer system 2000 may be embodied in any form. For example, the computer system 2000 may also be a distributed system that includes one or more connected computing components/devices that are in communication with the computer system 2000, a laptop computer, a mobile phone, a server, a data center, and/or any other computer system.

In its most basic configuration, computer system 2000 includes various different components. For example, FIG. 20 shows that computer system 2000 includes at least one processor 2005 (aka a "hardware processing unit"), sensors 2010, illuminators 2015, a depth detection system 2020, a mesh engine component 2025, and storage 2030. The storage 2030 is shown as including a permissions data structure 2035 (e.g., the permissions hierarchy 900 from FIG. 9), a mesh/mesh objects 2040, and code 2045.

The storage 2030 may be physical system memory, which may be volatile, non-volatile, or some combination of the two. The term "memory" may also be used herein to refer to non-volatile mass storage such as physical storage media. If the computer system 2000 is distributed, the processing, memory, and/or storage capability may be distributed as well. As used herein, the term "executable module," "executable component," or even "component" can refer to software objects, routines, or methods that may be executed on the computer system 2000. The different components, modules, engines, and services described herein may be implemented as objects or processors that execute on the computer system 2000 (e.g. as separate threads).

The disclosed embodiments may comprise or utilize a special-purpose or general-purpose computer including computer hardware, such as, for example, one or more processors (such as processor 2005) and system memory (such as storage 2030), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 2000 may also be connected (via a wired or wireless connection) to external sensors (e.g., one or more remote cameras, accelerometers, gyroscopes, acoustic sensors, magnetometers, etc.). Further, the computer system 2000 may also be connected through one or more wired or wireless networks 2050 to remote systems(s) that are configured to perform any of the processing described with regard to computer system 2000.

During use, a user of the computer system 2000 is able to perceive information (e.g., a mixed-reality environment) through a display screen that is included among any I/O interface(s) and that is visible to the user. The I/O interface(s) and sensors 2010 also include gesture detection devices, eye trackers, and/or other movement detecting components (e.g., cameras, gyroscopes, accelerometers, magnetometers, acoustic sensors, global positioning systems ("GPS"), etc.) that are able to detect positioning and movement of one or more real-world objects, such as a user's hand, a stylus, and/or any other object(s) that the user may interact with while being immersed in the scene.

A graphics rendering engine may also be configured, with the processor 2005, to render one or more virtual objects within a mixed-reality scene/environment. As a result, the virtual objects accurately move in response to a movement of the user and/or in response to user input as the user interacts within the virtual scene.

A "network," like the network 2050 shown in FIG. 20, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. The computer system 2000 will include one or more communication channels that are used to communicate with the network 2050. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally, or alternatively, the functionality described herein can be performed, at least in part, by one or more hardware logic components (e.g., the processor 2005). For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The illuminator 2015 may include infrared (IR) light illuminators or any other kind of illuminators. The depth detection system 2020 may be configured to perform the scanning operations described earlier. For example, the depth detection system 2020 may include a stereo matching depth detection system (e.g., active or passive) or a time of flight depth detection system. The mesh engine component 2025 may perform the operations related to accessing the 3D mesh, assigning permissions, or any of the other operations related to the 3D mesh, including utilizing machine learning to automatically perform the disclosed operations. The permissions data structure 2035 may include the permissions information about the 3D mesh, and the mesh/mesh objects 2040 may include the information about the holograms or other objects. Finally, code 2045 may be executable code that, when executed by the computer system 2000, causes the computer system 2000 to perform any of the disclosed operations.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for controlling access to objects based on permissions for those objects, the method being performed by a computer system and comprising:

accessing a three-dimensional (3D) mesh of a real-world physical environment, wherein the 3D mesh represents depth information for each object in a plurality of objects associated with the real-world physical environment, the 3D mesh including depth information for virtual representations of real-world physical objects associated with the real-world physical environment and depth information for virtual objects associated with the real-world physical environment;

causing the 3D mesh to be partitioned to create a corresponding partition for each of a plurality of identified sub-spaces that form parts of the real-world physical environment, wherein at least two of the sub-spaces in the plurality of identified sub-spaces correspond to different real-world physical rooms in the real-world physical environment;

assigning permissions to each object in the plurality of objects based on an identified association between each of the plurality of objects and a corresponding real-world physical room of the different real-world physical rooms in the real-world physical environment, whereby objects associated with a same real-world physical room are assigned a same permission, the different real-world physical rooms in the real-world physical environment being associated with different permission levels; and controlling access to each object in the plurality of objects based on the assigned permissions.

2. The method of claim 1, wherein a first object and a second object of the plurality of objects are identified as being of a same object type, the first object being associated with a first real-world physical room of the different real-world physical rooms in the real-world physical environment and the second object being associated with a second real-world physical room of the different real-world physical rooms in the real-world physical environment, and wherein the first object is assigned a different permissions than the second object even though the first object and the second object are of the same object type.

3. The method of claim 2, wherein the first real-world physical room is assigned one of a public permissions, a shared permissions, or a private permissions, wherein the second real-world physical room is assigned a different one of the public permissions, the shared permissions, or the private permissions, and wherein the first object is assigned a same permissions as the first real-world physical room and the second object is assigned a same permissions as the second real-world physical room.

4. A computer system comprising:
one or more processors; and
one or more computer-readable hardware storage devices having stored thereon computer-executable instructions that are executable by the one or more processors to cause the computer system to:
access a three-dimensional (3D) mesh of an environment that includes a plurality of objects, the 3D mesh representing depth information for each object in the plurality of objects, wherein each object in the plurality of objects is segmented and includes an associated type, and wherein the segmented objects correspond to one or more real-world objects and one or more virtual objects;
access a permissions hierarchy for the environment's 3D mesh, the permissions hierarchy indicating a permission that is associated with each of the segmented objects;
after querying the permissions hierarchy, determine that the computer system is permitted to access one or more of the segmented objects and that the computer system is not permitted to access at least one of the segmented objects;
cause the one or more segmented objects to be viewable on a display of the computer system; and
cause the at least one of the segmented objects which the computer system is not permitted to access to be fully censored from view to prevent the at least one of the segmented objects from being viewable on the display, or at least partially censor the at least one of the segment objects which the computer system is not permitted to access by providing a filtered view of the at least one of the segmented objects which the computer system is not permitted to access on the display.

5. The computer system of claim 4, where execution of the computer-executable instructions further causes the computer system to:
selectively enable interactive properties of at least one object based on the permissions.

6. The computer system of claim 4, wherein determining that the computer system is permitted to access one or more of the segmented objects is based, at least in part, on a permissions level of a user who is using the computer system.

7. The computer system of claim 4, wherein the permissions hierarchy categorizes the plurality of objects into groups, the groups including a group with a private permissions, a group with a shared permissions, and a group with a public permissions.

8. The computer system of claim 7, wherein a permission level required to access objects included within the group with the private permissions is higher than a permission level required to access objects included within either the group with the shared permissions or the group with the public permissions.

9. The computer system of claim 4, wherein querying the permissions hierarchy is performed by (1) collecting information associated with the computer system and (2) determining, based on the collected information, whether the computer system is permitted to access the one or more of the segmented objects, and wherein the collected information includes a determined user permission of a user who is using the computer system.

10. The computer system of claim 4, wherein querying the permissions hierarchy is performed by (1) collecting information associated with the computer system and (2) determining, based on the collected information, whether the computer system is permitted to access the one or more of the segmented objects, and wherein the collected information includes a determined device type or device attribute of the computer system.

11. A computer system comprising:
one or more processors; and
one or more computer-readable hardware storage devices having stored thereon computer-executable instructions that are executable by the one or more processors to cause the computer system to:
access a three-dimensional (3D) mesh of an environment that includes a plurality of objects, the 3D mesh representing depth information for each object in the plurality of objects, wherein each object in the plurality of objects is segmented and includes an associated type, and wherein the segmented objects correspond to one or more real-world objects and one or more virtual objects;

access a permissions hierarchy for the environment's 3D mesh, the permissions hierarchy indicating a permission that is associated with each of the segmented objects;

after querying the permissions hierarchy, determine that the computer system is permitted to access one or more of the segmented objects; and cause the one or more segmented of the objects to be viewable on a display of the computer system, wherein:

when the computer system is a virtual-reality computer system, then the 3D mesh is accessible and the one or more segmented objects are viewable even when the computer system is not physically proximate to the one or more real-world objects, and when the computer system is an augmented-reality computer system, then the 3D mesh is accessible and the one or more segmented objects are viewable only when the computer system is physically proximate to the one or more real-world objects.

12. The computer system of claim 11, where execution of the computer-executable instructions further causes the computer system to:

selectively enable interactive properties of at least one object based on the permissions.

13. The computer system of claim 11, wherein determining that the computer system is permitted to access one or more of the segmented objects is based, at least in part, on a permissions level of a user who is using the computer system.

14. The computer system of claim 11, wherein the permissions hierarchy categorizes the plurality of objects into groups, the groups including a group with a private permissions, a group with a shared permissions, and a group with a public permissions.

15. The computer system of claim 14, wherein a permission level required to access objects included within the group with the private permissions is higher than a permission level required to access objects included within either the group with the shared permissions or the group with the public permissions.

16. The computer system of claim 11, wherein querying the permissions hierarchy is performed by (1) collecting information associated with the computer system and (2) determining, based on the collected information, whether the computer system is permitted to access the one or more of the segmented objects, and wherein the collected information includes a determined user permission of a user who is using the computer system.

17. The computer system of claim 11, wherein querying the permissions hierarchy is performed by (1) collecting information associated with the computer system and (2) determining, based on the collected information, whether the computer system is permitted to access the one or more of the segmented objects, and wherein the collected information includes a determined device type or device attribute of the computer system.

* * * * *